US012692740B2

(12) United States Patent
Yun

(10) Patent No.: US 12,692,740 B2
(45) Date of Patent: Jul. 28, 2026

(54) REFRIGERATOR HAVING HINGE AND DAMPER

(71) Applicant: LG ELECTRONICS INC., Seoul (KR)

(72) Inventor: Hohyeang Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 18/440,177

(22) Filed: Feb. 13, 2024

(65) Prior Publication Data

US 2024/0352778 A1 Oct. 24, 2024

(30) Foreign Application Priority Data

Apr. 20, 2023 (KR) ........................ 10-2023-0052314
Sep. 8, 2023 (KR) ........................ 10-2023-0119747

(51) Int. Cl.
*E05F 3/20* (2006.01)
*F25D 23/02* (2006.01)

(52) U.S. Cl.
CPC .............. *E05F 3/20* (2013.01); *F25D 23/028* (2013.01); *E05Y 2900/31* (2013.01); *F25D 2323/024* (2013.01)

(58) Field of Classification Search
CPC ...... F25D 23/08; F25D 2323/024; E05F 5/08; E05F 3/20; E05Y 2900/31; F16F 9/32; E05D 11/0802; E05D 11/08; E05D 11/10; E05D 11/1028; E05D 11/1042; E05D 11/105
See application file for complete search history.

(56) References Cited

U.S. PATENT DOCUMENTS 4,166,522 A * 9/1979 Bourcier de Carbon .................... F16F 9/0218 188/317
6,415,477 B1 * 7/2002 Hosaka ................ G03G 15/605 16/284
6,553,617 B1 * 4/2003 Salice .................. F16F 9/3235 16/85
6,766,563 B2 * 7/2004 Lee ...................... A23B 7/0425 16/335
8,621,713 B2 * 1/2014 Zimmer .................. E05F 5/006 16/85

(Continued)

FOREIGN PATENT DOCUMENTS

CN 108020012 A * 5/2018 .......... F25D 23/028
IT 2019 0000 2843 A1 8/2020

(Continued)

OTHER PUBLICATIONS

Extended European Search Report for European Application No. 24156707.2, dated Oct. 31, 2024.

*Primary Examiner* — Emily M Morgan
(74) *Attorney, Agent, or Firm* — Birch, Stewart, Kolasch & Birch, LLP

(57) ABSTRACT

A refrigerator includes a cabinet forming a storage space; a door configured to open and close the cabinet; a hinge configured to connect the door and the cabinet and to support the door to be rotatable; and a damping mechanism providing a damping force to the door while the door rotates in a closing direction after opening the door, in which the damping force of the damping mechanism varies during a door closing process.

10 Claims, 30 Drawing Sheets

(56) References Cited

U.S. PATENT DOCUMENTS

| | | | | |
|---|---|---|---|---|
| 8,720,010 | B2 * | 5/2014 | Forster | E05F 5/006 16/286 |
| 8,973,218 | B2 * | 3/2015 | Yabukoshi | E05F 1/1261 16/281 |
| 10,145,162 | B2 * | 12/2018 | Liang | E05F 3/108 |
| 10,865,596 | B2 * | 12/2020 | Chen | E05F 5/027 |
| 10,865,597 | B2 * | 12/2020 | Chen | F16F 13/007 |
| 2007/0199178 | A1 * | 8/2007 | Katsumata | E05F 1/1261 16/286 |
| 2010/0212112 | A1 * | 8/2010 | Steurer | E05F 1/1261 16/277 |
| 2013/0000075 | A1 * | 1/2013 | Forster | E05F 5/006 188/266 |
| 2016/0245579 | A1 * | 8/2016 | Eom | E05F 5/02 |
| 2018/0373284 | A1 * | 12/2018 | Lewis | H01H 3/14 |
| 2020/0063327 | A1 * | 2/2020 | Byun | F16F 9/145 |
| 2020/0398756 | A1 * | 12/2020 | Wezel | B60R 1/076 |
| 2023/0383584 | A1 * | 11/2023 | Schneider | E05F 5/027 |
| 2024/0353167 | A1 * | 10/2024 | Kwon | E05F 3/04 |

FOREIGN PATENT DOCUMENTS

| | | | | |
|---|---|---|---|---|
| KR | 10-0509725 | B1 | 8/2005 | |
| KR | 20-0413325 | Y1 | 4/2006 | |
| KR | 10-2006-0075659 | A | 7/2006 | |
| KR | 10-0875757 | B1 | 12/2008 | |
| KR | 10-2011-0062324 | A | 6/2011 | |
| KR | 10-2020-0080991 | A | 7/2020 | |
| KR | 10-2022-0132619 | A | 9/2022 | |
| WO | WO 98/39543 | A1 | 9/1998 | |
| WO | WO-2021177476 | A1 * | 9/2021 | F25D 23/028 |

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

REFRIGERATOR HAVING HINGE AND DAMPER

CROSS-REFERENCE TO RELATED APPLICATIONS

The present application claims priority under 35 U.S.C. 119 to Korean Patent Application No. 10-2023-0052314, filed in the Republic of Korea on Apr. 20, 2023, and Korean Patent Application No. 10-2023-0119747, filed in the Republic of Korea on Sep. 8, 2023, which are hereby incorporated by reference in their entireties.

BACKGROUND

The present disclosure relates to a refrigerator.

In general, a refrigerator is a home appliance for storing foods in an internal storage space, which is shield by a door, at a low temperature by low temperature air. For this, the refrigerator is configured to accommodate the stored food in an optimum state by cooling the internal storage space using cold air generated through heat exchange with a refrigerant circulating in a refrigeration cycle.

In recent years, refrigerators tend to increase more and more in size and provide multi-functions due to the trends of change of dietary life and high quality, and thus, refrigerators having various structures in consideration of user convenience are brought to the market.

When a device is provided to provide a space for door storage of a refrigerator or to provide additional functions such as an ice maker or dispenser, a weight of the door increases. Even when heavy materials such as glass and metal are used to enhance an outer appearance of the refrigerator door, the weight of the door increases.

When the weight of the refrigerator door increases, there is a limitation that it takes a lot of effort to open and close the refrigerator door, and limitations such as noise or items falling due to an impact at the moment the door is closed may occur.

To solve these limitations, a refrigerator including a device that provides door closing force to a door rotation axis or a position that is adjacent to the door rotation axis is disclosed in Korea Patent Publication No. 10-2006-0075659 and Korea Patent Publication No. 10-2022-0132619.

However, in these technologies according to the related art, there is a limitation in that the closing force applied to the door is added, and thus, more force is required when opening the door, and there is a limitation in that the door is opened due to repulsive force at the moment the door is closed.

SUMMARY

One embodiment provides a refrigerator in which a door is automatically closed during a door closing process, and an impact is reduced by a damping mechanism when the door is closed.

Alternatively, or additionally, one embodiment provides a refrigerator in which an impact is reduced by a damping mechanism during a door closing process, while preventing resistance of the damping mechanism from acting when the door is opened.

Alternatively, or additionally, one embodiment provides a refrigerator capable of preventing micro-opening of a door.

A refrigerator according to an aspect may include a cabinet forming a storage space; a door configured to open and close the cabinet; a hinge configured to connect the door and the cabinet and to support the door to be rotatable; and a damping mechanism providing a damping force to the door while the door rotates in a closing direction after opening the door.

The damping force of the damping mechanism varies during a door closing process.

The damping mechanism may generate a first damping force when the door is closed at a first set angle or less. The damping mechanism may generate a second damping force less than the first damping force when the door is closed at a second set angle or less, smaller than the first set angle.

The damping mechanism may include a housing in which a space for accommodating oil is located; a cylinder configured to move in contact with the door or the cabinet; a piston configured to move within the space as the cylinder moves and having an orifice through which oil passes; and an elastic member providing elastic force to the piston.

The cylinder may include a first portion and a second portion having an inner diameter greater than that of the first portion.

A first damping force may be generated when the piston is positioned within the first portion, and a second damping force may be generated when the piston is positioned within the second portion.

The second portion may include a first section whose inner diameter increases as it moves away from the first portion; and a second section extending from the first section.

An inner diameter of the second section may be constant in a longitudinal direction or increase as it moves away from the first section.

The cylinder may include a rib protruding from an inner circumferential surface of the second portion. The piston within the second portion may be in contact with or adjacent to the rib.

A plurality of ribs may be disposed to be spaced apart from one another in a circumferential direction of the second portion.

The damping mechanism may include a case in which oil is accommodated, a movable wall configured to move within the case; and a slot formed in the movable wall. An inner circumferential surface of the case may include portions with different radii so that the damping force is variable during a moving process of the movable wall.

The inner circumferential surface of the case may include a first portion having a first radius; and a second portion having a second radius less than the first radius.

A first damping force may be generated when the movable wall moves in a first section corresponding to the first portion. A first damping force may be generated when the movable wall moves in a first section corresponding to the first portion, and a second damping force greater than the first damping force may be generated when the movable wall moves in a second section corresponding to the second portion.

The damping force of the damping mechanism may increase and then decrease during the door closing process. Alternatively, the damping force of the damping mechanism may be increased or decreased step by step in the door closing process.

A refrigerator according to another aspect may include a cabinet forming a storage space; a door configured to open and close the cabinet; a hinge configured to connect the door and the cabinet and to support the door to be rotatable; and a damping mechanism connected to a hinge shaft of the hinge.

The damping mechanism may generate a damping force during a door opening process, and the damping force may be generated even during a door closing process.

The damping mechanism may generate the damping force within a first angle range while the door is opened and generate the damping force within a second angle range while the door is closed.

The damping mechanism may include a case in which oil is accommodated, a first member accommodated in the case and connected to the hinge shaft; and a second member movable relative to the first member. The second member may move in a straight line when the first member rotates.

The damping mechanism may further include an elastic member configured to elastically support the second member.

The first member may include a first space in which the oil is accommodated, the second member may include a second space in which the oil is accommodated. A buffer space accommodating the oil may be formed between the case and the second member.

The first member may include a first uneven part; and the second member may include a second uneven part that can engage with the first uneven part according to a rotational position of the first member.

A refrigerator according to another aspect may include a cabinet forming a storage space; a door configured to open and close the cabinet; a hinge configured to connect the door and the cabinet and to support the door to be rotatable; and a damping mechanism connected to a hinge shaft of the hinge, the damping mechanism may include a case in which oil is accommodated; a movable wall configured to move within the case; and a valve provided on the movable wall and configured to adjust oil flow within the case according to a moving direction of the movable wall.

The movable wall may include a slot, and the valve may be located in the slot. The valve may restrict the flow of oil in the slot while the movable wall moves in one direction during a door closing process, and allow the flow of oil in the slot while the movable wall moves in another direction during a door opening process.

The valve may include a first portion located on one side of the movable wall, a second portion extending from the first portion and positioned in the slot; and a third portion extending from the second portion and located on the other side of the movable wall.

The first portion may include a first flow path, and the movable wall may include the second flow path.

While the movable wall moves in one direction during the door closing process, the first portion may shield the slot, and oil may flow through the first flow path and the second flow path.

A height of the third portion may be formed to be less than a height of the slot.

While the movable wall moves in the other direction during the door closing process, the first portion may be spaced apart from the slot and thus the slot may be opened, and the oil may flow through the slot.

A length of the second portion may be greater than a thickness of the movable wall.

A refrigerator according to another aspect may include a cabinet forming a storage space; a door configured to open and close the cabinet; a hinge configured to connect the door and the cabinet and to support the door to be rotatable; and a damping mechanism connected to a hinge shaft of the hinge.

The damping mechanism may include a case in which oil is accommodated, a movable wall configured to move within the case, and a slot formed in the movable wall.

The inner circumferential surface of the case may include portions with different radii so that the damping force varies during a moving process of the movable wall.

The inner circumferential surface of the case may include a first portion having a first radius and a second portion having a second radius less than the first radius. A first damping force may be generated when the movable wall moves in a first section corresponding to the first portion, and a second damping force greater than the first damping force may be generated when the movable wall moves in a second section corresponding to the second portion.

The damping force of the damping mechanism may increase and then decrease during the door closing process. The damping force of the damping mechanism may be increased or decreased step by step during the door closing process.

DETAILED DESCRIPTION OF THE EMBODIMENTS

Figure 1:
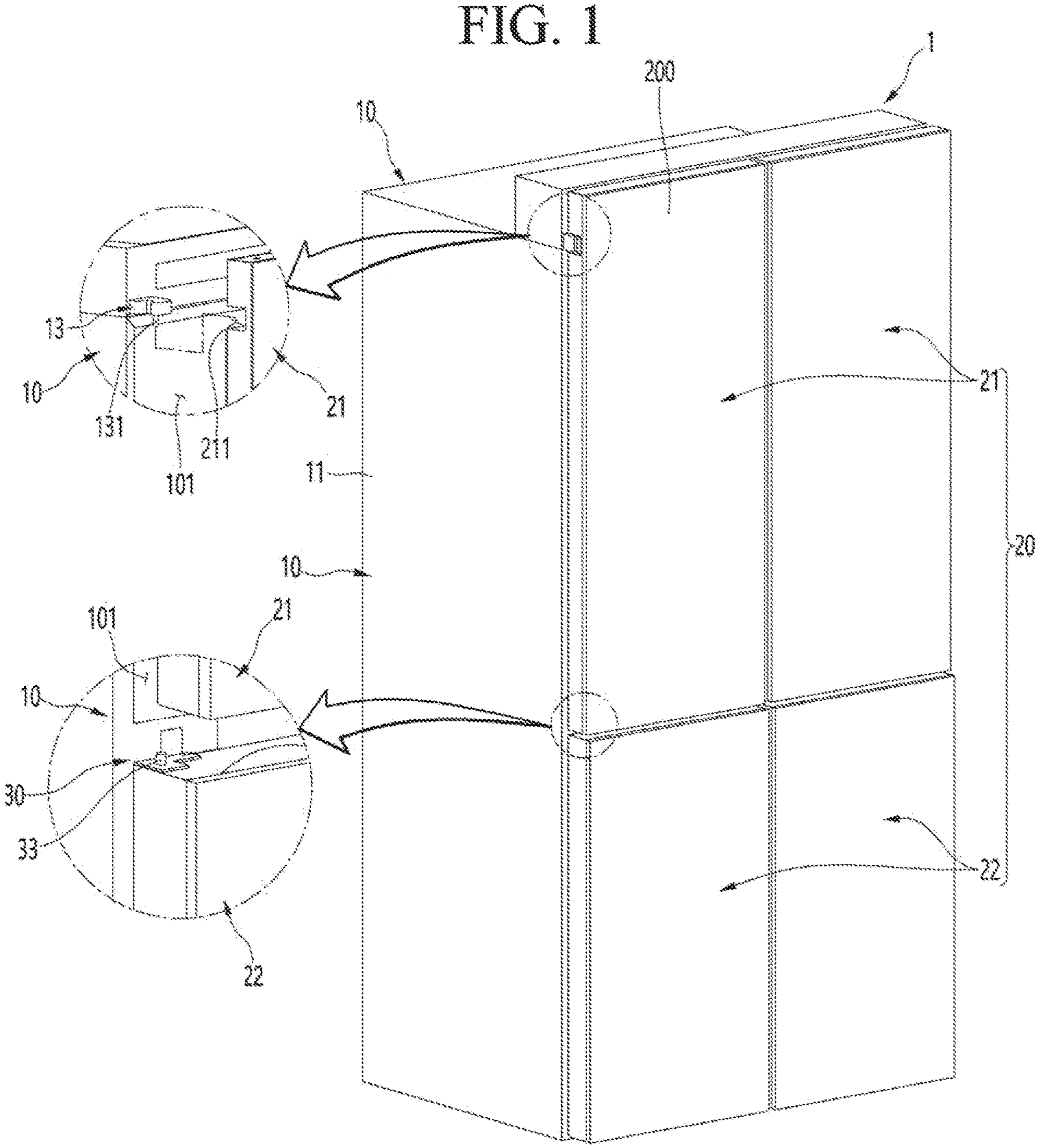
FIG. 1 is a perspective view illustrating a refrigerator according to a first embodiment.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Before explain the embodiments, various directions are defined. In an embodiment of the present disclosure, a direction facing a front surface of the door illustrated in FIG. 1 may be defined as a front direction, a direction facing a cabinet with respect to the front surface of the door will be defined as a rear direction, a direction facing a bottom surface on which the refrigerator is installed will be defined as a downward direction, and a direction that is away from the bottom surface will be defined as an upward direction. When indicating a previously undefined direction, the direction may be described by being defined based on each drawing.

FIG. 1 is a perspective view illustrating a refrigerator according to a first embodiment.

Referring to FIG. 1, the refrigerator 1 according to the first embodiment of the present disclosure may include a cabinet 10 forming a storage space with an open front surface, and a door 20 opening and closing the storage space.

The cabinet 10 may be formed in a hexahedral shape with an open front surface, and may include an upper surface, a lower surface, left and right sides, and a rear surface. At this time, each surface of the cabinet 10 may be connected to each other in at least one configuration.

A storage space may be formed inside the cabinet 10. The inside of the cabinet 10 may be divided up and down to form multiple storage spaces. For example, the storage space 101 may be divided into an upper refrigerating chamber and a lower freezing chamber.

A door 20 may be provided in front of the cabinet 10. There may be a plurality of doors 20, and each door 20 may be configured to independently open and close the storage space.

For example, the door 20 may include an upper door 21 disposed at the upper portion and a lower door 22 disposed at the lower portion. A pair of the upper doors 21 may be disposed to be rotatable on both left and right sides. The upper door 21 may be referred to as a refrigerating chamber door. A pair of the lower doors 22 may be disposed to be rotatable to both left and right sides. The lower door 22 may be called a freezing chamber door.

The door 20 may be configured in various ways according to the disposition of the storage space. In the present embodiment, an example provided with four doors will be described, but it should be noted in advance that the present disclosure is applicable to all refrigerators equipped with at least one rotating door.

The door 20 may have a rotatable structure in which the upper and lower ends are axially coupled, and may be referred to as a rotary door. Below, the mounting structure is considered based on the upper door 21. Hereinafter, the upper door 21 will be referred to as "a door 20."

The door 20 may be rotatably mounted on the cabinet 10 using a first hinge 13 and a second hinge 30. The door 20 may form the outer appearance of the front surface of the refrigerator 1 in a closed state. A panel 200 forming the outer appearance may be provided on the front surface of the door 20. For example, the panel 200 may be made of glass. A door storage member may be further provided at the rear of the door 20. If necessary, the door 20 may be equipped with a dispenser or an ice maker.

The door 20 may extend further upward of the cabinet 10 and may be rotatable by the first hinge 13 mounted on the cabinet 10. The first hinge 13 may rotatably connect the upper portion of the door 20 to the cabinet 10. The first hinge 13 may be fixed to one of the left and right sides of the upper surface of the cabinet 10.

The first hinge 13 may include a first hinge shaft 131 protruding downward. The first hinge shaft 131 may be axially coupled to the hinge mounting part 211 formed on the upper portion of the door 20.

The second hinge 30 is provided on the front surface of the cabinet 10 and may rotatably support the door 20 from below. The second hinge 30 may be located on one of the left and right sides of the front surface of the cabinet 10 and may be mounted in the same direction as the first hinge 13.

The second hinge 30 may include a second hinge shaft 33 protruding upward. The second hinge shaft 33 may be connected to the lower side of the door 20. Accordingly, the door 20 can be rotated based on the first hinge shaft 131 and the second hinge shaft 33. The first hinge shaft 131 and the second hinge shaft 33 may be located on the same extension line as the rotation center of the door 20.

In an embodiment of the present disclosure, the second hinge 30 can rotatably support the door 20 regardless of the position of the door 20. The auto-closing device 25 including the second hinge 30 and the damping mechanism 26 may be disposed at the upper end of the door 20. In other words, it should be noted that there are no restrictions on the positions of the auto-closing device 25 and the damping mechanism 26.

Hereinafter, the second hinge 30 and the related structures thereof will be described, and for convenience of explanation, the second hinge 30 will be referred to as "a hinge 30."

Figure 2:
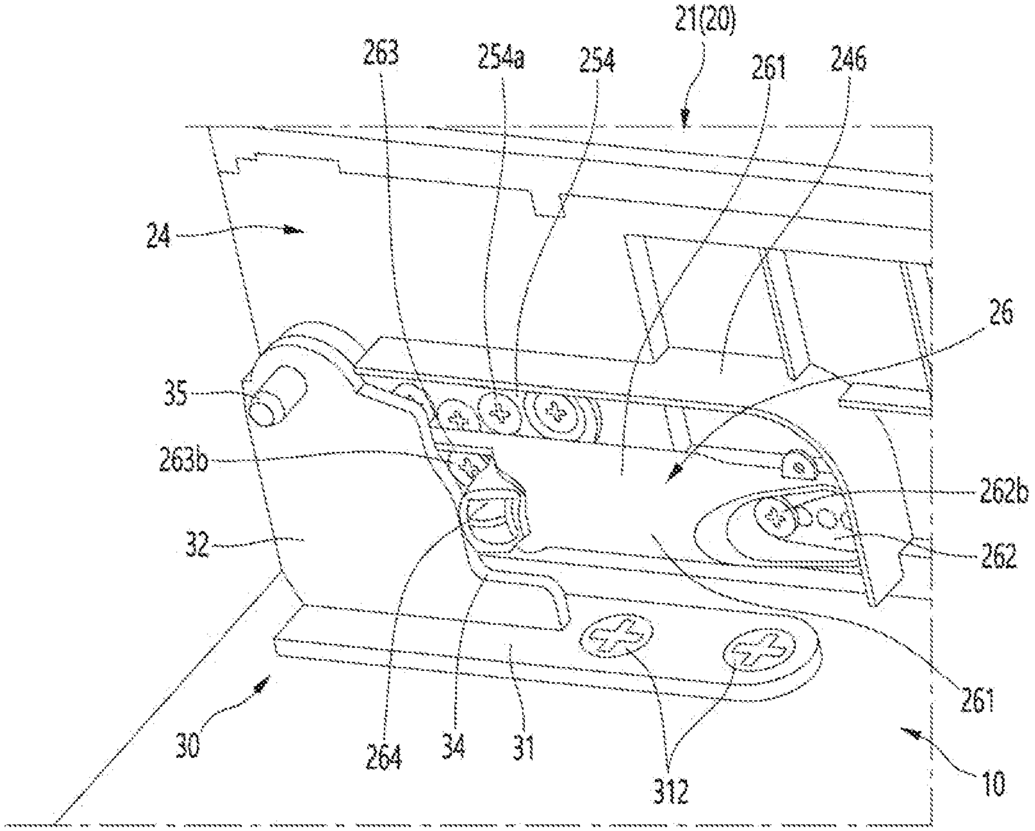
FIG. 2 is a partial perspective view illustrating the lower end of the door of a refrigerator according to the first embodiment.
Figure 3:
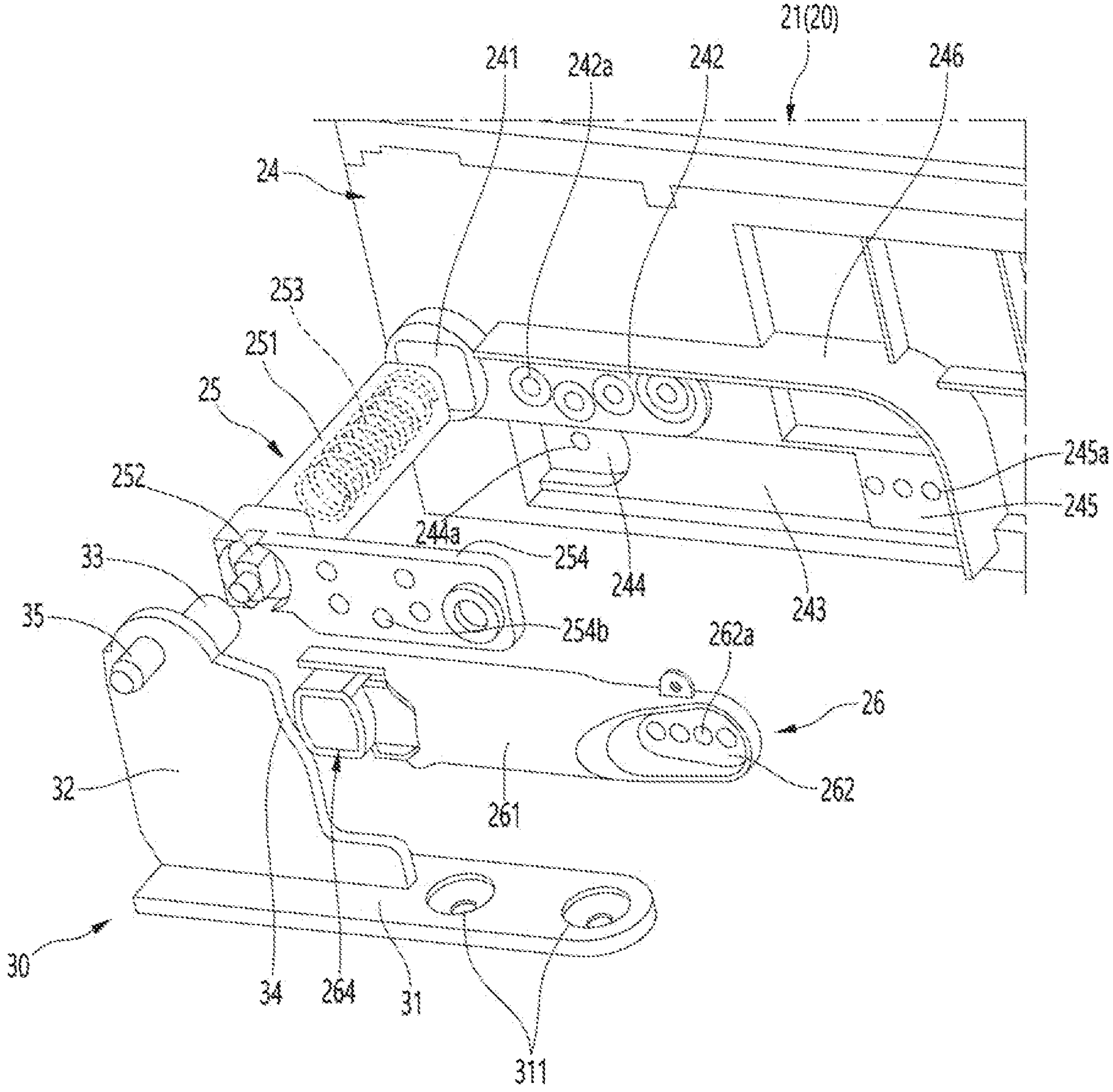
FIG. 3 is an exploded perspective view illustrating the coupling structure of an auto closing device, a damping mechanism, and a hinge in FIG. 2.

FIG. 2 is a partial perspective view illustrating the lower end of the door of a refrigerator according to the first embodiment, and FIG. 3 is an exploded perspective view illustrating the coupling structure of an auto closing device, a damping mechanism, and a hinge in FIG. 2.

Referring to FIGS. 2 and 3, a cap decoration 24 may be provided on the upper and lower surfaces of the door 20. For example, the cap decoration 24 forms the lower surface of the door, and the damping mechanism 26 may be mounted thereon. The cap decoration 24 may be further equipped with an auto-closing device 25.

The auto-closing device 25 may be mounted on the cap decoration 24. The auto-closing device 25 may provide a closing force to the door 20 during a door 20 closing process, allowing the door 20 to close automatically.

For example, the auto-closing device 25 may be located on the same extension line as the rotation center of the door 20 and may be coupled with the hinge 30 to serve as the rotation shaft of the door 20.

The auto-closing device 25 may include a case 251. The case 251 may be inserted into the door 20. For example, the case 251 may extend in the vertical direction.

A spring 253 may be accommodated inside the case 251. The case 251 may be provided with a shaft coupling part 252. The shaft coupling part 252 may be connected to the spring 253. The shaft coupling part 252 may be exposed below the case 251. The shaft coupling part 252 may be coupled to the second hinge shaft 33 formed on the hinge 30 when the door 20 is mounted and may rotate together when the door 20 rotates.

The spring 253 is formed in a coil spring structure and may be compressed or tensioned according to the rotation of the shaft coupling part 252. The spring 253 acts when the door 20 is at a set angle ($\alpha 1$ in FIG. 7) or less to provide elastic force so that the door 20 can be completely closed.

The auto-closing device 25 can prevent elastic force from being applied during a door 20 rotating process so that the door is opened due to the structure of the case 251 and the shaft coupling part 252.

The auto-closing device 25 described above is only an example of the present disclosure, and various other structures provided on the door 20 or the hinge 30 may be applied to enable the door 20 to automatically close.

Meanwhile, a laterally extending case bracket 254 may be formed on the case 251. The case bracket 254 can be firmly fixed to the cap decoration 24 by a screw 254*a*.

A case insertion port 241 on which the auto-closing device 25 is mounted may be formed on the lower surface of the cap decoration 24. The case insertion port 241 may be formed on the same extension line as the rotation center of the door 20. The case insertion port 241 is formed in a shape corresponding to the cross-sectional shape of the case 251, so that the case 251 may be inserted.

The cap decoration 24 may be provided with a case mounting part 242. The case bracket 254 may be mounted on the case mounting part 242. A plurality of screw holes 242*a* are formed in the case mounting part 242, and a screw 254*a* penetrating the screw hole 254*b* of the case bracket 254 may be fastened.

A hinge 30 may be mounted on the cabinet 10. The lower end of the door 20 may be rotatably mounted on the hinge 30. The hinge 30 may be formed of a metal material.

The hinge 30 may include a hinge bracket 31 and a hinge plate 32.

The hinge bracket 31 may be fixedly mounted on the front surface of the cabinet 10. One or more screw holes 311 may be formed in the hinge bracket 31. A screw 312 may be fastened to the screw hole 311 to fix the hinge 30 to the cabinet 10.

The hinge plate 32 may extend in a direction crossing the hinge bracket 31. The hinge plate 32 may be formed to have a predetermined thickness.

A contact surface 34 with which the damping mechanism 26 is in contact may be formed around the hinge plate 32.

A second hinge shaft 33 may be formed on the hinge plate 32. The second hinge shaft 33 may protrude upward and be coupled to the shaft coupling part 252. In other words, in the auto-closing device 25, the shaft coupling part 252 rotates around the second hinge shaft 33 as the door 20 rotates, and at this time, the door 20 may be automatically closed due to the elastic force of the elastic member 253.

Meanwhile, when the hinge 30 is disposed between the upper door 21 and the lower door 22, the hinge 30 may rotatably support the upper end of the lower door 22. For example, a hinge shaft 35 protruding downward may be further formed on the lower surface of the hinge plate 32. The hinge shaft 35 may be axially coupled to the upper end of the lower door 22. According to the mounting position of the hinge 30 and the disposition state of the door 20, the hinge shaft 35 protruding downward from the hinge plate 32 may be omitted.

The cap decoration 24 may be provided with the damping mechanism 26. The damping mechanism 26 can reduce the closing speed of the door 20. The damping mechanism 26 may be referred to as a hydraulic damper or oil damper because a damping force is applied due to resistance when oil flows inside.

The damping mechanism 26 may be disposed on one side of the hinge plate 32.

The damping mechanism 26 may be selectively in contact with the hinge plate 32 when the door 20 rotates.

The damping mechanism 26 may be selectively pressed by the hinge plate 32 according to the rotation angle of the door 20 when the door 20 is rotated in the closing direction.

The door 20 may be closed at a constant speed in at least some sections of the closing section due to the damping force of the damping mechanism 26. The damping mechanism 26 and the hinge plate 32 may reduce the re-opening of the door 20 due to a repulsive force at the moment when the door 20 is completely closed. The structure of the damping mechanism 26 will be discussed in more detail below.

The cap decoration 24 may be provided with a mounting part 243 for mounting the damping mechanism 26. The mounting part 243 may be provided at a position corresponding to the side of the hinge plate 32. The mounting part 243 may be recessed to accommodate at least a portion of the housing 261 of the damping mechanism 26.

A first mounting part 244 and a second mounting part 245 to which both ends of the housing 261 are fixed may be provided on both sides of the mounting part 243. Screw holes 244*a* and 245*a* may be formed in the first mounting part 244 and the second mounting part 245, and screws 262*b* and 263*b* that penetrate the housing 261 are fastened so that the damping mechanism 26 may be firmly fixed. Meanwhile, a plurality of screw holes 245*a* may be provided in the longitudinal direction of the damping mechanism 26. Accordingly, the position of the damping mechanism 26 may be adjusted and mounted according to the type of the door 20, and thus it may be possible to apply it to various types of doors 20. Damping mechanisms 26 of different lengths or damping mechanisms 26 of different strokes of the cylinder 264 may be selectively mounted.

The cap decoration 24 may be provided with a shielding part 246. The shielding part 246 may protrude downward from the lower surface of the cap decoration 24 and may protrude further downward than the damping mechanism 26. Accordingly, the damping mechanism 26 may not be exposed by the shielding part 246 when viewed from the front.

The shielding part 246 may extend longer than the side end of the damping mechanism 26 and may extend rearward from the extended end portion to prevent the damping mechanism 26 from being exposed laterally.

The shielding part 246 extends from the left end of the damping mechanism 26 (as seen in FIG. 3) to the right, and the extended end portion may be bent to extend to the rear end of the cap decoration 24.

The cap decoration 24 may be made of plastic material. The cap decoration 24 may be integrally molded with the case mounting part 242 and the damper mounting part 243, including the shielding part 246. Accordingly, the damping mechanism 26 and the auto-closing device 25 can be mounted on the cap decoration 24 in a molded and assembled state. The door 20 may be rotatably coupled to the hinge 30 when the damping mechanism 26 and the auto-closing device 25 are mounted.

Figure 4:
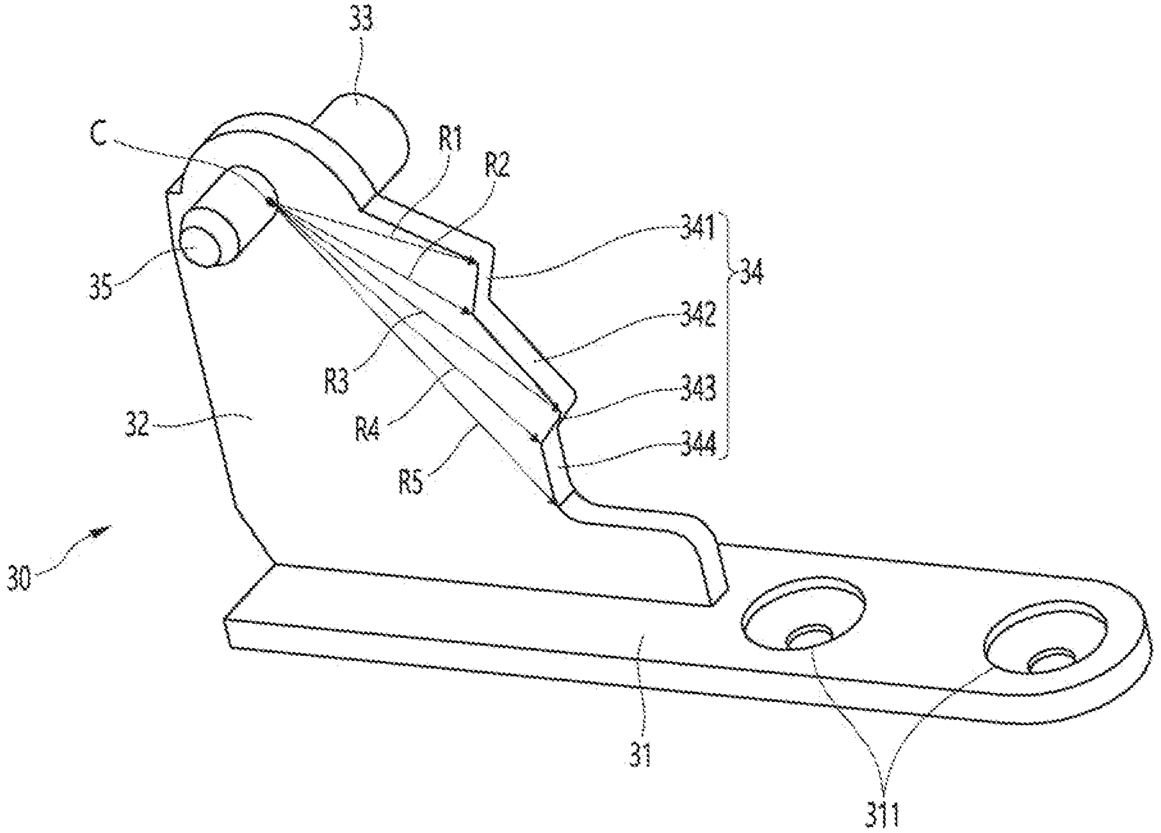
FIG. 4 is a perspective view illustrating a hinge according to the first embodiment.

FIG. 4 is a perspective view illustrating a hinge according to the first embodiment.

Referring to FIG. 4, the hinge 30 may include the hinge bracket 31 and the hinge plate 32.

The contact surface 34 may be formed on a circumference of an edge of the hinge plate 32 facing the damping mechanism 26.

According to the opening and closing angle of the door 20, the contact surface 34, which is in contact with the cylinder 264 to be described later, may be provided on a portion of the entire circumferential surface of the hinge plate 32. The contact surface 34 may be in contact with the damping mechanism 26 on the entire surface of the hinge plate 32 when the door 20 is opened at a set angle (α2 in FIG. 7) or less.

The remaining circumferential surface of the hinge plate 32 on which the contact surface 34 is not formed may not be in contact with the damping mechanism 26.

The contact surface 34 may include a first part 341. The first part 341 is the portion that the cylinder 264 first contacts during a door 20 closing process. Since the first part 341 starts contact with the cylinder 264, the first part may be referred to as a starting portion.

The section in which the first part 341 is formed among the entire contact surface may be referred to as a first section or an entry section.

The distance R1 from the rotation center c of the door 20, that is, the rotation shaft to the starting point of the first part 341 may be the same as the distance R2 from the rotation shaft to the ending point of the first part 341. In other words, a portion from the starting point to the ending point of the first part 341 may have the same radius from the rotation shaft. Of course, the first part 341 may be formed to connect the starting point of the first part 341 and the ending point of the first part 341 with a straight line.

The slope between the upper starting point and the lower ending point of the first part 341 may be less than the slope of the third part 343, which will be described below. The length between the starting and ending points of the first part 341 may be longer than that of the third part 343, which will be described later.

The contact surface 34 may further include a second part 342 extending from the first part 341. The second part 342 may be connected to the ending point of the first part 341 and may extend obliquely from the first part 341.

The second part 342 is in contact with the cylinder 264 to provide damping force and substantially presses the cylinder 264, so the second part may be referred to as a pressing part 342.

The section of the entire contact surface 34 where the second part 342 is formed may be referred to as a second section or a variable section.

The distance R3 from the rotation center c of the door 20 to the ending point of the second part 342 may be formed to be greater than the distance R2 from the rotation center c of the door 20 to the starting point of the second part 342. In other words, the portion from the starting point to the ending point of the second part 342 may be formed to gradually move away from the rotation shaft. For example, the second part 342 may be formed to connect a starting point and an ending point with a straight line. Of course, at least a portion of the second part 342 may be formed in a round shape.

The contact surface 34 may further include a third part 343 extending from the second part 342. The third part 343 may be connected to the ending point of the second part 342 and may extend obliquely from the second part 342.

The third part 343 does not additionally press the cylinder 264 when in contact with the cylinder 264, and therefore may be referred to as a holding part 343.

The section of the entire contact surface 34 where the third part 343 is formed may be referred to as a third section or an invariable section.

The distance R3 from the rotation shaft of the door 20 to the starting point of the third part 343 and the distance R4 from the rotation shaft to the ending point of the third part 343 may be the same. In other words, a portion from the starting point to the ending point of the third part 343 may be formed to have the same radius from the rotation shaft. Of course, the third part 343 may be formed to connect the starting point of the third part 343 and the ending point of the third part 343 with a straight line.

The slope between the upper starting point and the lower ending point of the third part 343 may be greater than the slope of the first part 341, which will be described below. The length between the starting point and the ending point of the third part 343 may be shorter than that of the first part 341.

The contact surface 34 may further include a fourth part 344 extending from the third part 343. The fourth part 344 is connected to the ending point of the third part 343 and may extend obliquely from the third part 343.

The fourth part 344 can be referred to as a restraint part 344 because the fourth part maintains the cylinder 264 in close contact with the elastic member 265 when the door 20 is completely closed. The fourth part 344 may form the last section of the contact surface 34.

The section of the entire contact surface 34 where the fourth part 344 is formed may be referred to as a fourth section or a stop section.

The distance R5 from the rotation center c of the door 20 to the ending point of the fourth part 344 may be made greater than the distance R4 from the rotation center c of the door 20 to the starting point of the fourth part 344. In other words, the portion from the starting point to the ending point of the fourth part 344 may be formed to gradually move away from the rotation shaft. The fourth part 344 may be formed to connect a starting point and an ending point with a straight line. Of course, if necessary, at least a portion of the fourth part 344 may be formed in a round shape with a curvature.

The fourth part 344 may accommodate the end portion of the cylinder 264. The fourth part 344 is in contact with the cylinder 264 and may stably accommodate the cylinder 264 when the door 20 is closed.

The distance difference between the starting point and the ending point from the hinge shaft of the fourth part 344 may be less than the distance difference between the starting point and the ending point from the hinge shaft of the second part 342. Accordingly, the damping mechanism 26 in the fourth part 344 provides a relatively smaller damping force to the door 20 so that the door 20 can be stably closed.

When the cylinder 264 is in contact with the fourth part 344, the stroke of the cylinder 264 becomes the shortest. Accordingly, the length L2 from one end portion of the cylinder 264 to the other end portion of the damping mechanism 26 can be minimized.

Meanwhile, the contact surface 34 may be composed of only the second part 342, the third part 343, and the fourth part 343. In addition to the second part 342, third part 343, and fourth part 343, the contact surface 34 may further include another section that can be in contact with the cylinder 264. Alternatively, the third part 343 may be omitted.

Hereinafter, the damping mechanism 26 will be examined in more detail with reference to the drawings.

Figure 5:
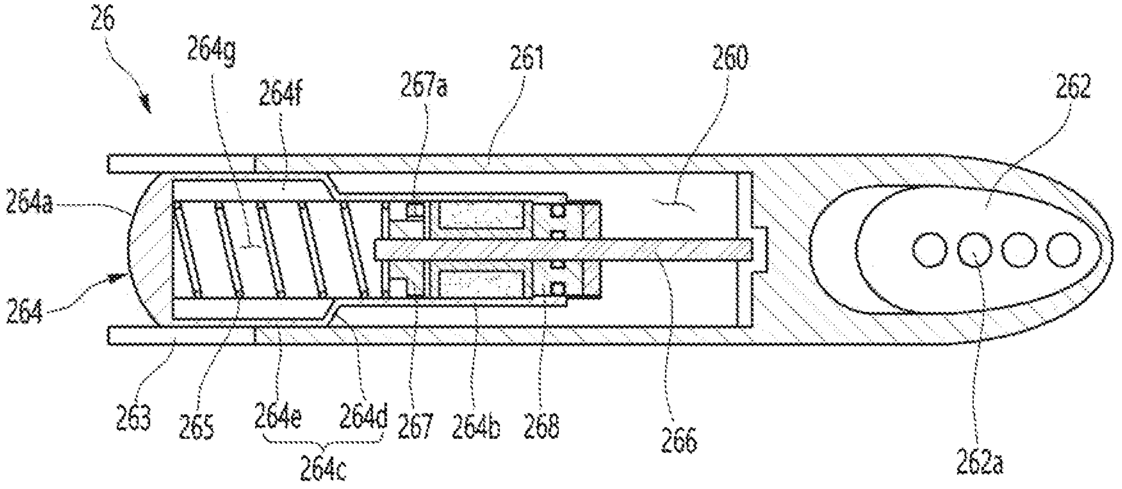
FIG. 5 is a cross-sectional view illustrating a damping mechanism according to the first embodiment.
Figure 6:
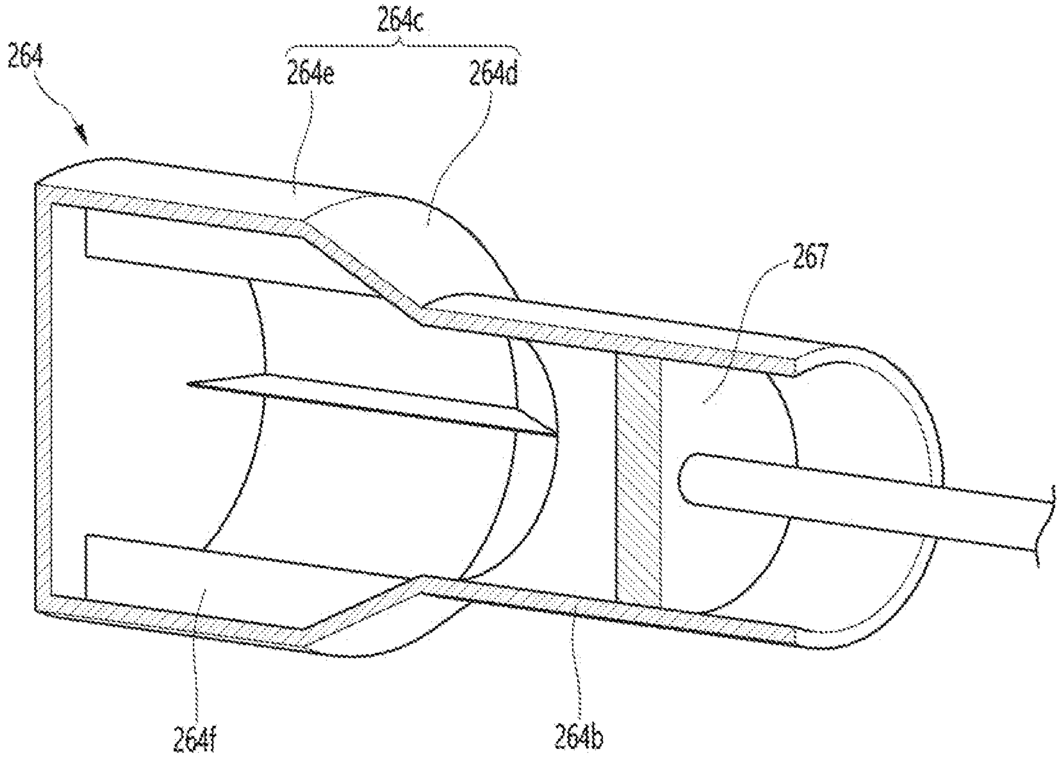
FIG. 6 is a partial cross-sectional view illustrating the inside of the cylinder in the damping mechanism of FIG. 5.

FIG. 5 is a cross-sectional view illustrating a damping mechanism according to the first embodiment, and FIG. 6 is a partial cross-sectional view illustrating the inside of the cylinder in the damping mechanism of FIG. 5.

Referring to FIGS. 5 and 6, the damping mechanism 26 may have an external shape formed by the housing 261.

An accommodation space 260 with one side open may be formed in the housing 261. A cylinder 264 may be accommodated inside the accommodation space 260. The housing 261 is open at one end so that the cylinder 264 can be inserted, and the cylinder 264 may be protruded or inserted through the open end portion of the housing 261.

A first coupling part 263 mounted on the first mounting part 244 may be provided at one end of the housing 261 based on the center. A screw **263*b* is fastened to the first coupling part 263 to secure one end of the housing 261 to the cap decoration 24. The other end of the housing 261 may be provided with a second coupling part 262 mounted on the second mounting part 245. A plurality of screw holes 262*a* may be formed in the second coupling part 262, and a screw 262*b* may be fastened to the second coupling part 262 to fix the other end of the housing 261 to the cap decoration 24. Meanwhile, the fixed position of the damping mechanism 26 may be determined through a combination of positions of the plurality of screw holes 262*b* and 245*a***.

The cylinder 264 may be inserted into the accommodation space 260. The cylinder 264 may include a contact part **264*a* in contact with the hinge plate 32. In the present embodiment, the cylinder 264 moves with respect to the housing 261, so the cylinder 264** may be referred to as a moving member.

The contact part **264*a* may be formed in a shape that protrudes at the central portion and becomes lower toward both ends. Accordingly, the protruding central portion of the contact part 264*a* contacts the contact surface 34 and a force may be applied in the direction crossing the tangent line of the contact surface 34, that is, in the insertion direction of the cylinder 264. Both ends of the cylinder 264 are formed in a lowered shape with respect to the central portion, thereby preventing unnecessary interference with points other than one point of the contact surface during the rotation of the door 20 and the damping mechanism 26**.

For example, the contact part **264*a* may be formed in a curved shape. The contact part 264*a* may be formed to have a curvature corresponding to the contact surface 34**.

One end of the cylinder 264 may be exposed to the outside of the housing 261, and the other end thereof may remain inserted into the accommodation space 260. When the cylinder 264 is pressed, the cylinder 264 can be inserted while being buffered by the flow of oil inside the damping mechanism 26.

Meanwhile, a buffer space **264*g* with one end open may be formed inside the cylinder 264. A piston 267 may be movably disposed within the buffer space 264*g*. The open end portion of the cylinder 264 may be shielded by a sealing member 268**.

At this time, the piston 267 may be supported by the elastic member 265 within the buffer space **264*g*. The buffer space 264*g* may be filled with oil for damping. A rod 266 may be connected to the piston 267. The rod 266 passes through the sealing member 268 and extends to the outside of the cylinder 264 and may be fixed to the inside of the housing 261**.

The buffer space **264*g* may be formed in the accommodation space 260 as needed. The buffer space 264*g* may be located inside the housing 261, that is, within the accommodation space 260**.

The state in FIG. 5 is a state where the cylinder 264 protrudes the most, and in this state, when the end portion of the cylinder 264 is pressed, the cylinder 264 moves to the right (as seen in FIG. 5) and may be inserted into the inside of the housing 261. At this time, the cylinder 264 moves along the rod 266, and the piston 267 can relatively move to the left (as seen in FIG. 5) within the buffer space **264*g*. In the present embodiment, the rod 266** may be referred to as a fixing member.

In the present embodiment, the damping force of the damping mechanism 26 may be varied during a door 20 closing process.

The cylinder 264 may include a first portion **264*b*. The cylinder 264 may further include a second portion 264*c* having an inner diameter greater than that of the first portion 264*b***.

The damping force generated when the piston 267 moves within the first portion **264*b*** may be referred to as the first damping force. The first damping force may occur when the door is closed at the first reference angle or less.

When the piston 267 moves within the first portion **264*b*, the oil in the buffer space 264*g* may be moved to the space between the piston 267 and the sealing member 268 along the orifice 267*a* formed in the piston 267**.

The oil in the buffer space **264*g* flows at a constant flow rate along or through the orifice 267*a***, thereby providing a constant oil resistance. This oil resistance acts as a first damping force. The first damping force may be constant or variable.

The damping force generated when the piston 267 moves within the second portion **264*c*** may be referred to as a second damping force. The second damping force may be less than the first damping force. The second damping force may occur when the door is closed at a second reference angle or less that is smaller than the first reference angle.

When the piston 267 moves within the second portion **264*c*, a portion of the oil (first oil amount) in the buffer space 264*g* may be moved to the space between the piston 267 and the sealing member 268 along the space between the inner circumferential surface of the second portion 264*c* and the piston 267. Another portion of the oil (second oil amount) in the buffer space 264*g* may pass through the orifice and move into the space between the piston 267 and the scaling member 268**. The first oil amount may be greater than the second oil amount.

Oil resistance may occur while the oil passes through the orifice, and since the first oil amount is greater than the second oil amount, the second damping force is less than the first damping force.

The second portion 264*c* may include a first section 264*d* obliquely extending from the first portion 264*b* and a second section 264*e* extending from the first section 264*d*. The inner diameter of the second section 264*e* may be equal to or greater than the maximum inner diameter of the first section 264*d*. The inner diameter of the second section 264*e* may be constant in the longitudinal direction (or the moving direction of the cylinder) or may increase as it moves away from the first section 264*d*.

When the piston 267 is located inside the second portion 264*c*, the second damping force may be varied according to the difference in diameter between the first section 264*d* and the second section 264*c*. For example, in a door 20 closing process, the second damping force may be reduced.

The reduced second damping force may be constant until the door 20 is completely closed. At this time, the reduced second damping force may be 0 or greater than 0.

A rib 264*f* may be provided on the inner circumferential surface of the second portion 264*c* to prevent the piston 267 from moving in a direction crossing the longitudinal direction of the cylinder 264.

The rib 264*f* may extend in the longitudinal direction from the inner circumferential surface of the second portion 264*c*. The rib 264*f* may be in contact with the piston 267 or may be disposed close to the outer surface of the piston 267. For example, a plurality of ribs 264*f* may be disposed to be spaced apart in the circumferential direction of the inner circumferential surface of the second portion 264*c*.

When the cylinder 264 is moved in the insertion direction, the elastic member 265 may be compressed. When the external force applied to the cylinder 264 is removed, the cylinder 264 returns to the original position thereof due to the elasticity of the elastic member 265, and the oil between the piston 267 and the sealing member 268 may flow back toward the buffer space 264*g*. The cylinder 264 may be moved while inserted into the housing 261, and the stroke protruding out of the housing 261 may be set to a length that can maintain contact with the contact surface 34.

At least one structure of the housing 261, cylinder 264, piston 267, sealing member 268, and rod 266 that constitutes the damping mechanism 26 may have various other structures in addition to the present embodiment. In other words, the oil damping structure for buffering the cylinder 264 in contact with the contact surface 34 may be applied in various ways.

Figure 7:
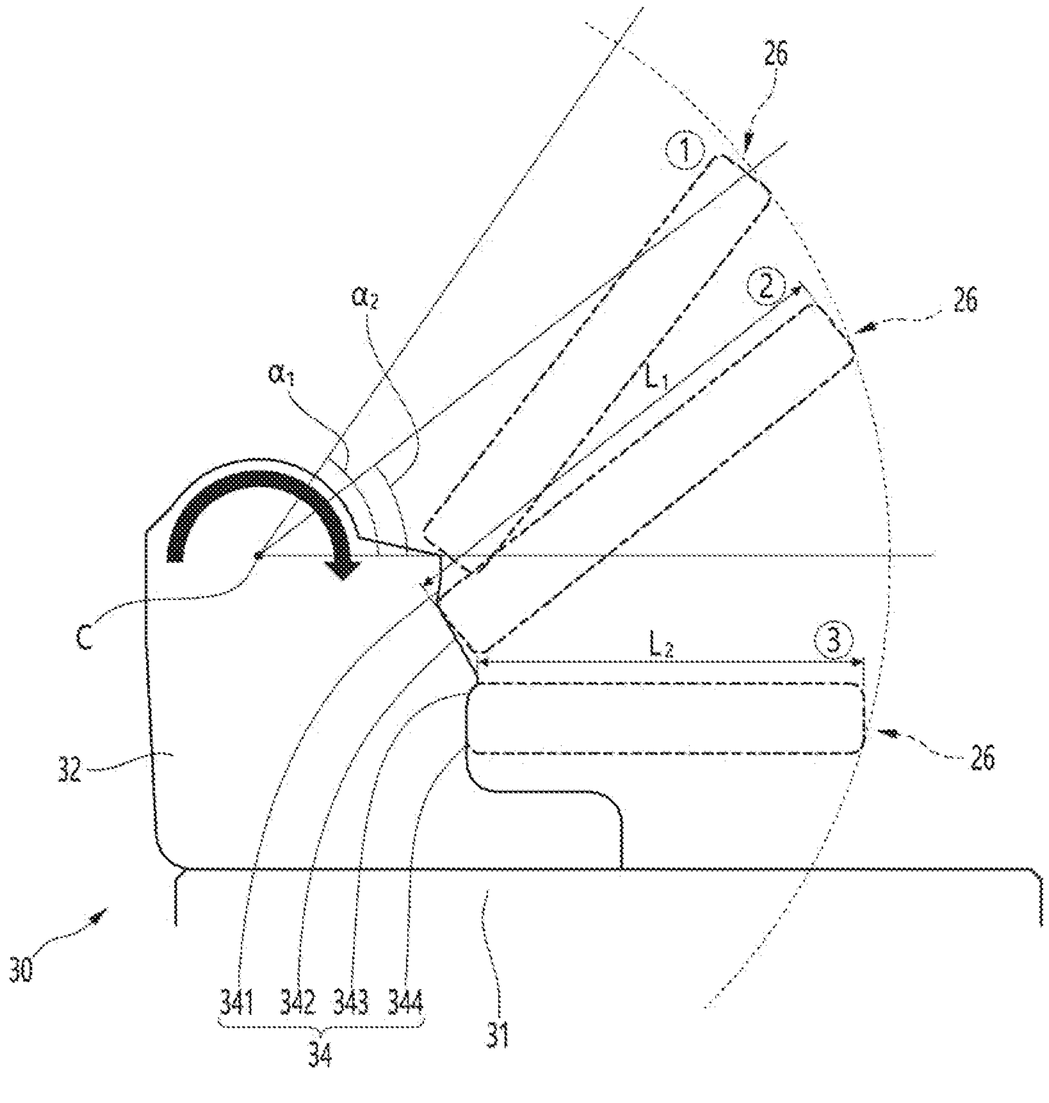
FIG. 7 is a view illustrating the operating range of the auto-closing device and the damping mechanism according to the rotation angle of the door according to the first embodiment.
Figure 8:
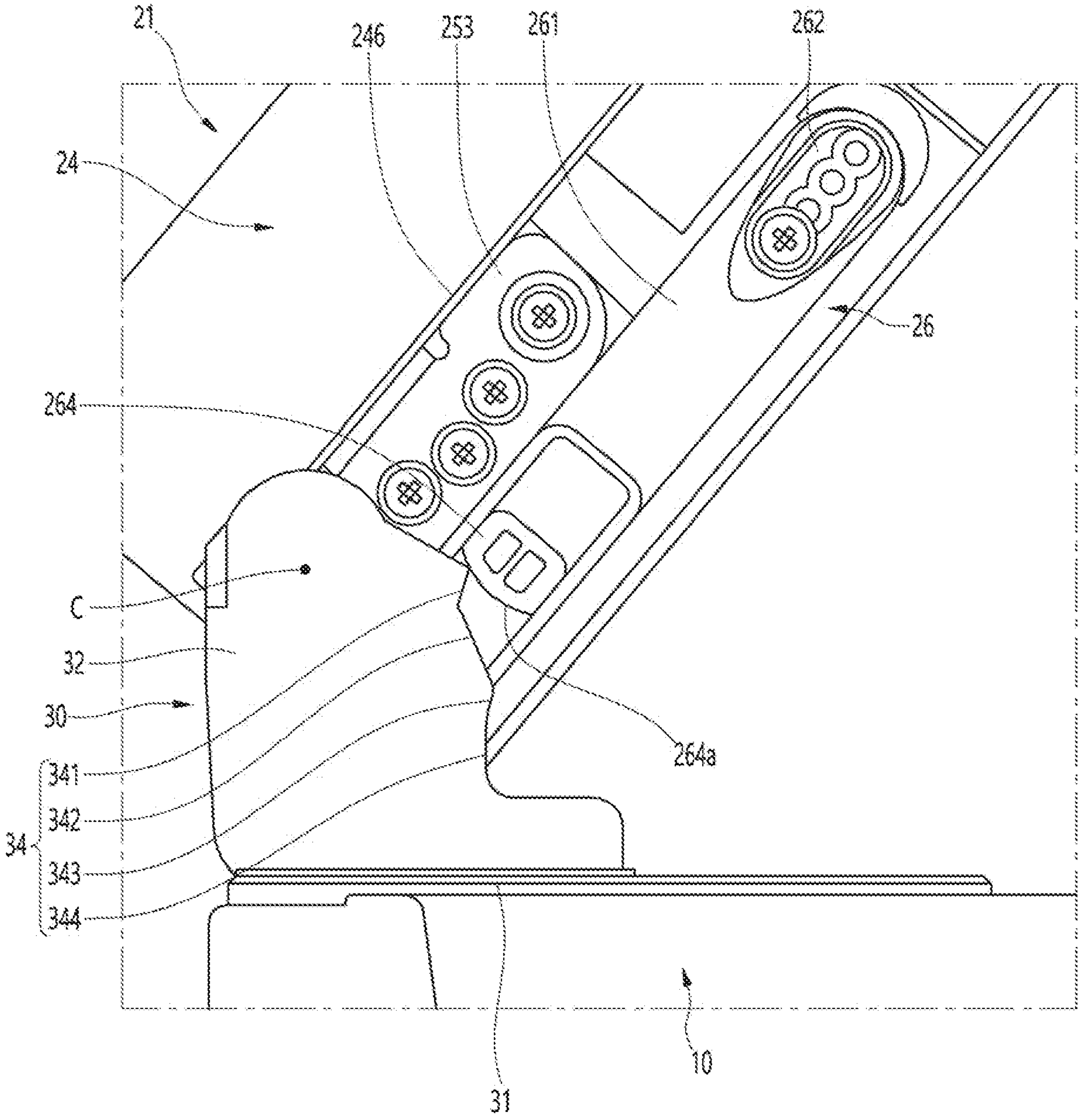
FIGS. 8 to 10 are views illustrating the contact state between the hinge and the damping mechanism as the door rotates.
Figure 9:
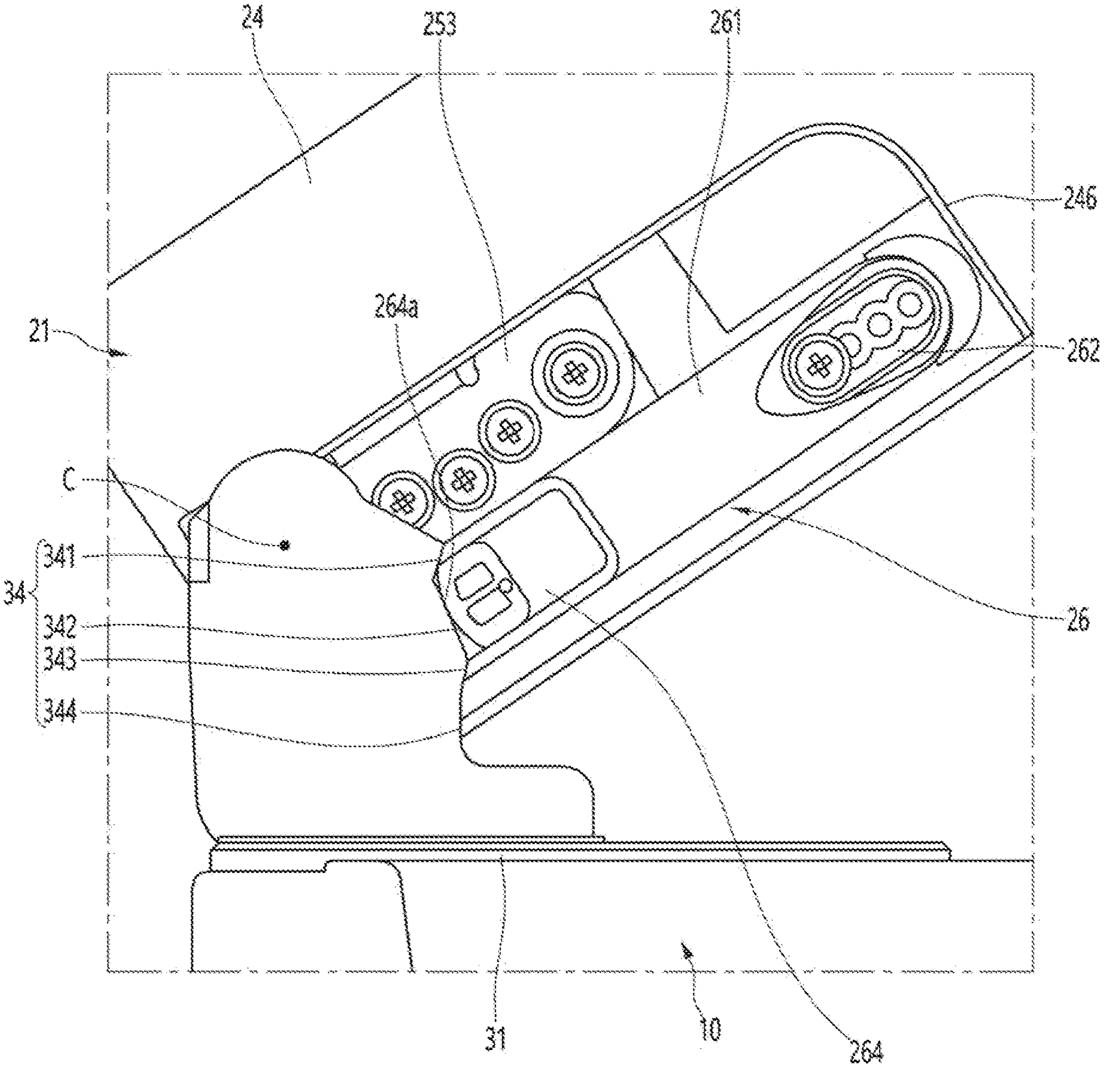
Figure 10:
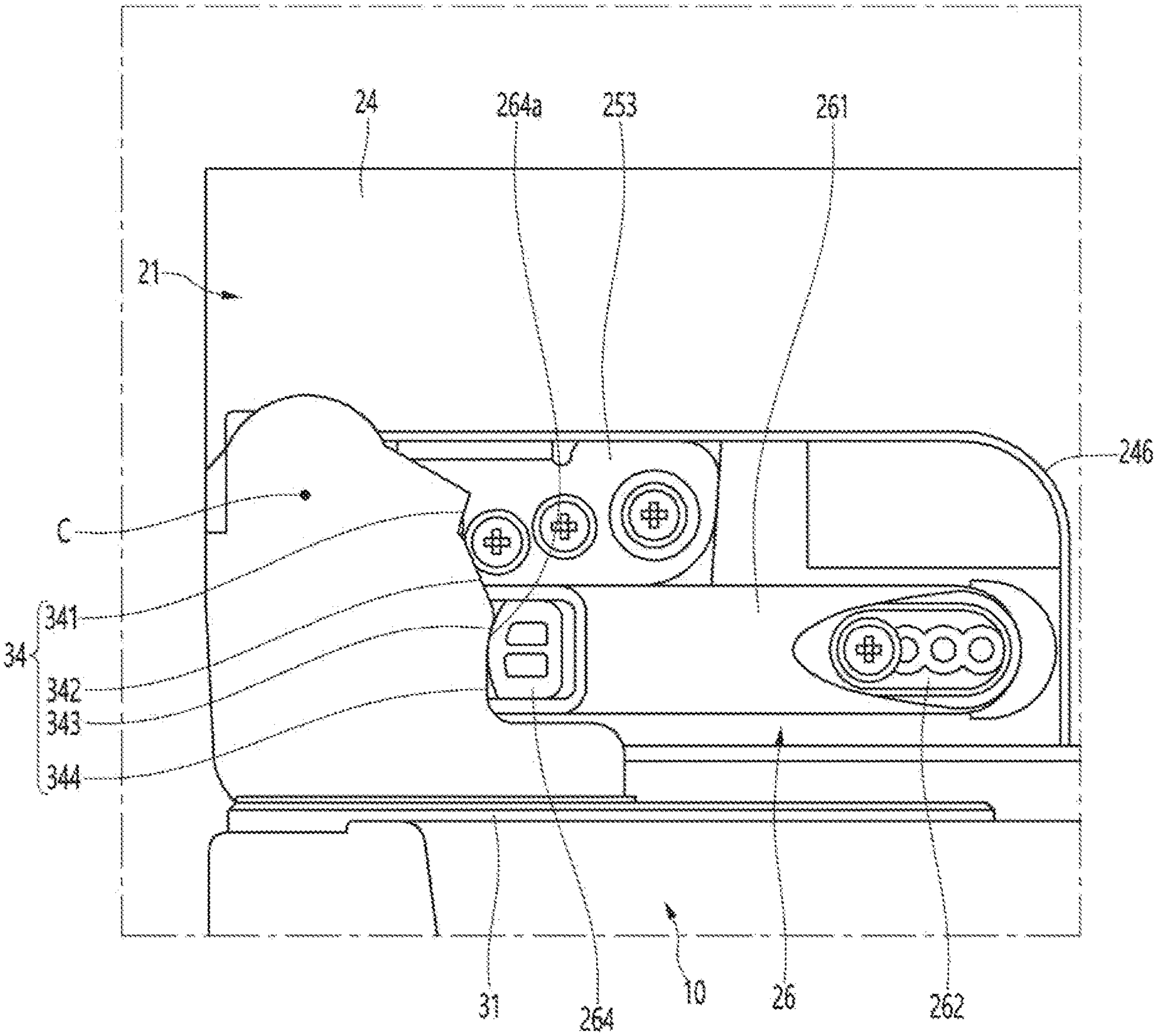
Figure 11:
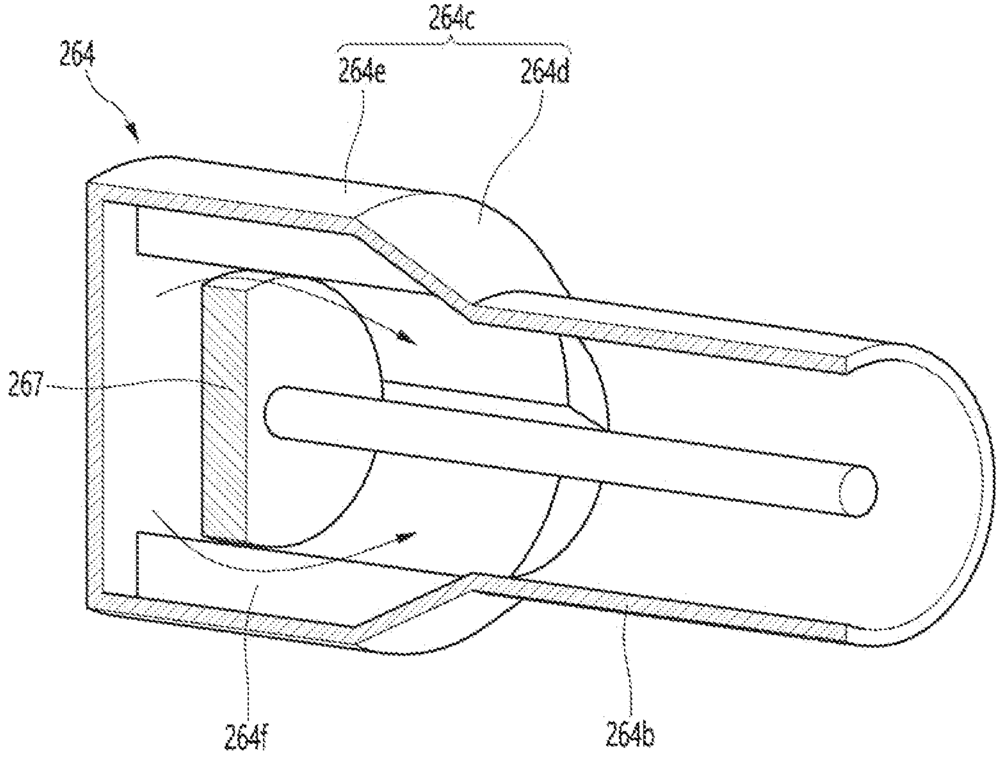
FIG. 11 illustrates the flow of oil when the piston according to the first embodiment is positioned in the second portion of the cylinder.

FIG. 7 is a view illustrating the operating range of the auto-closing device and the damping mechanism according to the rotation angle of the door according to the first embodiment, FIGS. 8 to 10 are views illustrating the contact state between the hinge and the damping mechanism as the door rotates, and FIG. 11 illustrates the flow of oil when the piston according to the first embodiment is positioned in the second portion of the cylinder.

Referring to FIGS. 5 to 11, in a fully open state, the door 20 is closed by a user's rotation operation up to the first set angle $\alpha 1$.

When the door 20 is closed at the first set angle $\alpha 1$ or less, the auto-closing device 25 starts operating, and the auto-closing device 25 may allow the door 20 to close without user manipulation.

When the auto-closing device 25 starts operating, the damping mechanism 26 and the hinge plate 32 may not contact each other to ensure smooth closing of the door 20. Therefore, force is applied only in the direction in which the door is closed, and the door can rotate quickly.

When the door 20 reaches the first set angle $\alpha 1$, the damping mechanism 26 may be in contact with the first part 341 of the contact surface 34. Alternatively, the damping mechanism 26 may contact the first part 341 of the contact surface 34 after the door 20 reaches the first set angle $\alpha 1$. In other words, the damping mechanism 26 may operate while the auto-closing device 25 is operating.

At this time, as a preparatory step for the actual action of the damping force, only a slight damping force is applied and the damping for deceleration of the door 20 may not be substantially performed (State ① in FIG. 7).

The rotational trajectory of the cylinder 264 in contact with the first part 341 may be located concentric with the first part 341, and thus the stroke of the cylinder 264 may not change.

In a door 20 closing process, when the second set angle $\alpha 2$ or less is reached, the cylinder 264 may be in contact with the contact surface 34 to provide a damping effect (state ② in FIG. 7). At this time, the damping mechanism 26 may not be involved in the rotation of the door 20 when the door 20 is opened at the second set angle $\alpha 2$ or more.

In other words, during a door 20 automatically closing process by the auto-closing device 25, the damping mechanism 26 begins to contact the second part 342 of the contact surface 34 and the door 20 may be closed at constant speed.

As the cylinder 264 moves from the starting point to the ending point of the second part 342, the stroke at which the cylinder moves inside the housing 261 gradually increases, and accordingly, the first damping force is generated in the damping mechanism 26.

In other words, while the cylinder 264 moves along the second part 342, the piston 267 is located within the first portion 264*b*. Before the cylinder 264 reaches the ending point of the second part 342, the cylinder 264 may be positioned within the second portion 264*c*.

Accordingly, while the cylinder 264 moves along the second part 342, the damping force of the damping mechanism 26 may vary. In other words, the damping force of the damping mechanism 26 may be reduced from the first damping force to the second damping force.

When the door 20 is further rotated and closed by the third set angle, the cylinder 264 contacts the third part 343. For example, the third set angle may be 7° to 4°. When the door 20 is rotated in the closing direction, the cylinder 264 may be moved into contact with the third part 343.

When the cylinder 264 is in contact with the third part 343, the cylinder 264 is located within the second portion 264*c*. Accordingly, the second damping force is generated while the cylinder 264 moves along the third part 343.

Finally, when the door 20 is completely closed, the damping mechanism 26 is in contact with the fourth part 344 of the contact surface 34 (State ③ in FIG. 7).

In the present embodiment, the damping force of the damping mechanism 26 is reduced or eliminated before the door 20 is completely closed, so the door 20 can be prevented from remaining open without closing.

The fourth part 344 may be in close contact with the contact part 264*a* of the cylinder 264. At this time, the inclined part of the third part 343 may be in close contact with the upper end of the contact part 264*a*.

At the moment when the door 20 is completely closed, the fourth part 344 and the third part 343 may be in close contact with the front end of the cylinder 264 to prevent the door 20 from being opened by reaction force.

Due to the elastic force of the elastic member 265, the cylinder 264 is brought into closer contact with the fourth part 344 and the third part 343, so that the door 20 may be stably maintained in a closed state.

The damping mechanism 26 is accelerated by the auto-closing device 25 and reduces the speed of the door 20 when the door 20 is closed, thereby ensuring a smooth closing operation of the door 20, wherein the shock at the moment when the door 20 is closed may be reduced.

Meanwhile, when the door is provided with a filler to prevent cold air from leaking, the opening angle of the door 20, when the first damping force is changed to the second damping force, may be greater than the opening angle of the door when the filler starts to fold.

In other words, the folding of the pillar may start in a state where the damping force of the damping mechanism 26 is reduced. Resistance is generated during a pillar folding process, and in the case of the present embodiment, the damping force of the damping mechanism 26 is reduced before the pillar is folded, so there is an advantage in that the door 20 can be closed stably.

Figure 12:
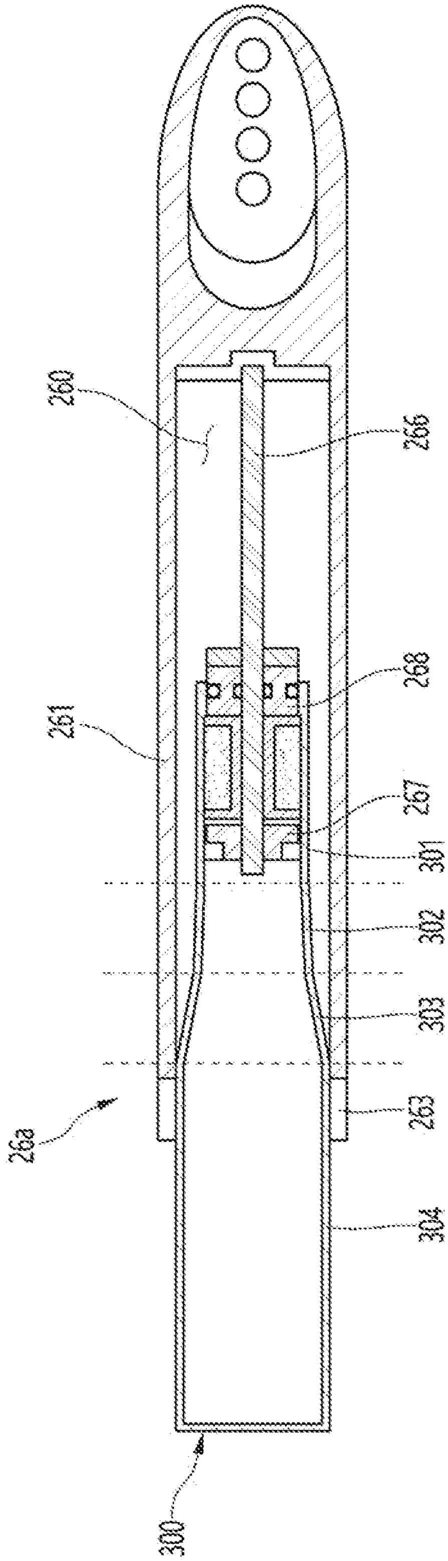
FIG. 12 is a cross-sectional view illustrating a damping mechanism according to the second embodiment.
Figure 13:
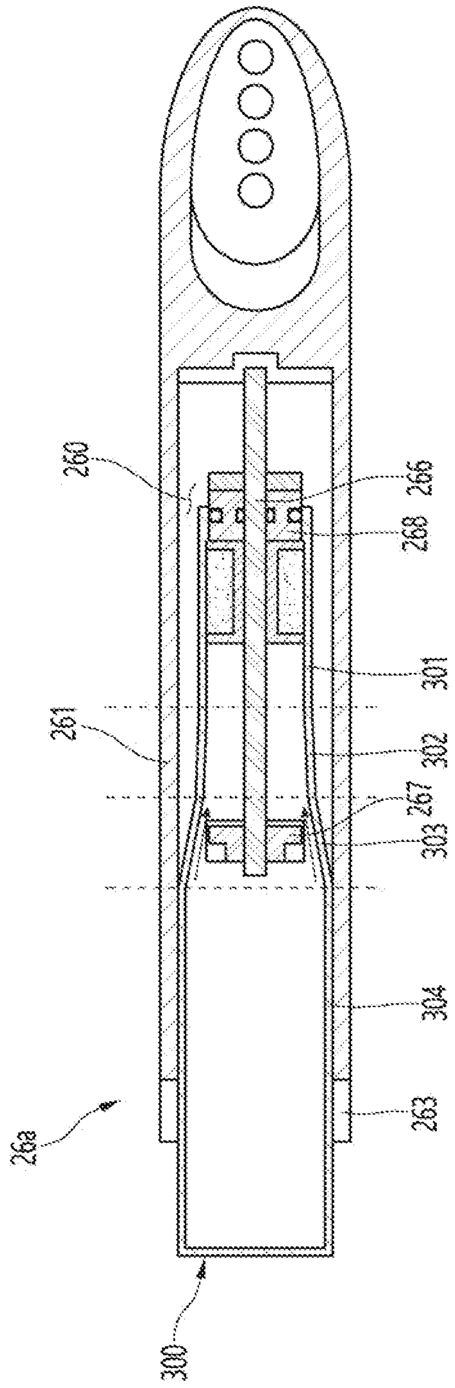
FIG. 13 is a view illustrating a state where the second piston is located in the third portion of the cylinder.

FIG. 12 is a cross-sectional view illustrating a damping mechanism according to the second embodiment, and FIG. 13 is a view illustrating a state where the second piston is located in the third portion of the cylinder.

The present embodiment is the same as the first embodiment in other portions, except that there is a difference in the cylinder. Therefore, hereinafter, the characteristic portions of the present embodiment will be described.

Referring to FIGS. 12 and 13, the external shape of the damping mechanism **26*a* in the present embodiment may be formed by the housing 261**.

The housing 261 may have an accommodation space 260 open on one side. A cylinder 300 may be accommodated inside the accommodation space 260. The housing 261 is open at one end so that the cylinder 300 can be inserted, and the cylinder 300 can be protruded or inserted through the open end portion of the housing 261.

The cylinder 300 may include a first portion 301. The damping force generated when the piston 267 moves within the first portion 301 may be referred to as the first damping force. The cylinder 300 may include a second portion 302 extending from the first portion 301.

The inner diameter of the second portion 302 may be greater than the inner diameter of the first portion 301. The inner diameter of the second portion 302 may increase as the distance from the first portion 301 increases. In other words, the second portion 302 may be inclined with respect to the first portion 301.

The damping force generated when the piston 267 moves within the second portion 302 may be referred to as a second damping force. The second damping force is less than the first damping force.

The cylinder 300 may further include a third portion 303 extending from the second portion 302. The inner diameter of the third portion 303 may increase as it moves away from the second portion 302. In other words, the third portion 303 may be inclined with respect to the second portion 302.

At this time, the inclination angle of the third portion 303 with respect to the first portion 301 may be greater than the inclination angle of the second portion 302 with respect to the first portion 301.

The damping force generated when the piston 267 moves within the third portion 303 may be referred to as a third damping force. The third damping force is less than the second damping force.

The cylinder 300 may further include a fourth portion 304 extending from the third portion 303. The inner diameter of the fourth portion 304 may be greater than the inner diameter of the third portion 303. Alternatively, the inner diameter of the fourth portion 304 may be the same as the maximum inner diameter of the third portion 303. The inner diameter of the fourth portion 304 may be constant in the longitudinal direction or may increase as it moves away from the third portion 303.

The damping force generated when the piston 267 moves within the fourth portion 304 may be referred to as the fourth damping force. The fourth damping force is less than the third damping force.

In the present embodiment, as the inner diameter of the cylinder 300 becomes greater, the amount of oil flowing between the inner circumferential surface of the cylinder 300 and the piston 267 increases, thereby reducing the damping force.

Therefore, in the case of the present embodiment, a damping force is generated in a certain section where the door is closed, and the generated damping force can be gradually reduced.

In the present embodiment, the cylinder 300 has been described as an example of including four portions with different inner diameters, but it should be noted that the spirit of the present disclosure is that the cylinder 300 includes three or more portions with different inner diameters.

Meanwhile, when controlling the damping force of the damping mechanism **26*a* in multiple stages, it is also possible to generate the damping force in the process of the damping mechanism 26*a* contacting the cabinet 10 without contacting the hinge 30**.

In other words, when the damping mechanism **26*a* is installed on the door 20 and the door 20 is closed at the set angle or less, the damping mechanism 26*a* may contact the cabinet 10. Additionally, in a door 20 continuously closing process, the damping force of the damping mechanism 26*a*** may be reduced.

This damping mechanism **26*a* can also be installed in the cabinet 10 instead of being installed in the door 20. In this case, when the door 20 is closed at the set angle or less, the damping mechanism 26*a* may contact the door 20 or the hinge. Additionally, in a door 20 continuously closing process, the damping force of the damping mechanism 26*a*** may be reduced.

Figure 14:
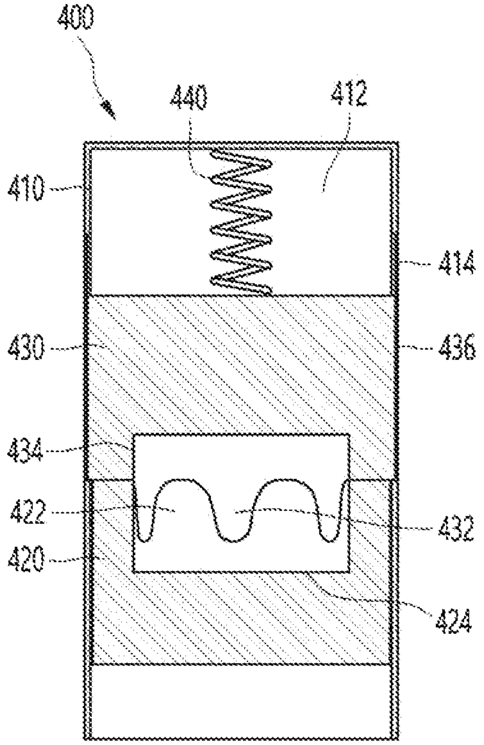
FIG. 14 is a cross-sectional view illustrating a damping mechanism according to the third embodiment.

FIG. 14 is a cross-sectional view illustrating a damping mechanism according to the third embodiment.

FIGS. 15 to 18 are views illustrating the state of the damping mechanism according to the rotation of the door according to the third embodiment.

Figure 15:
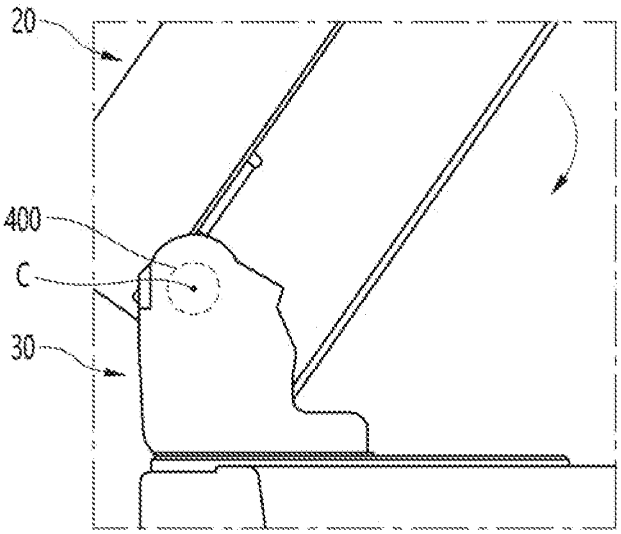
FIGS. 15 to 18 are views illustrating the state of the damping mechanism according to the rotation of the door according to the third embodiment.
Figure 15:
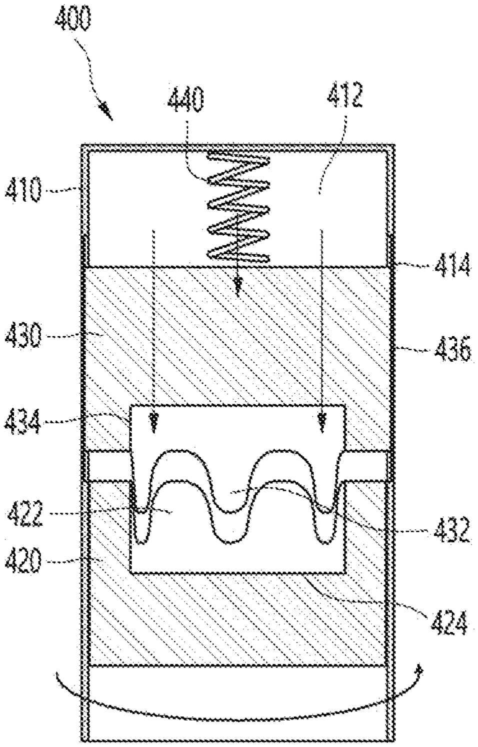
Figure 16:
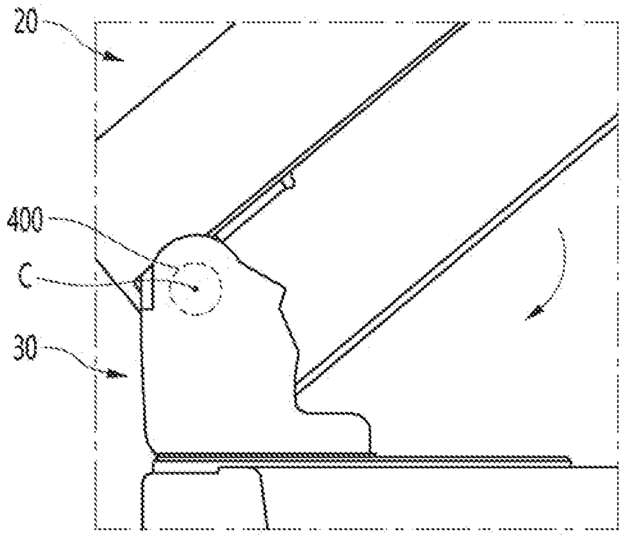
Figure 16:
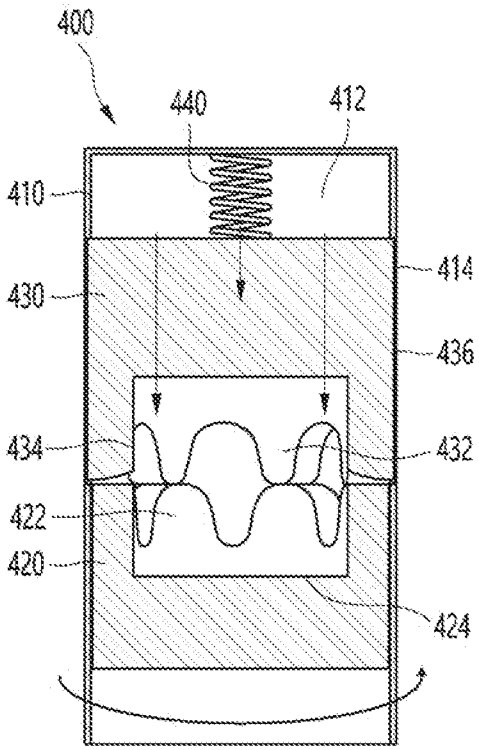
Figure 17:
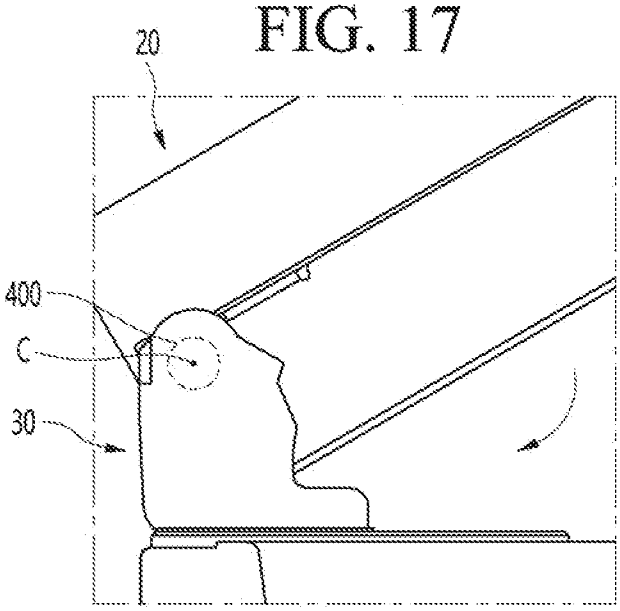
Figure 17:
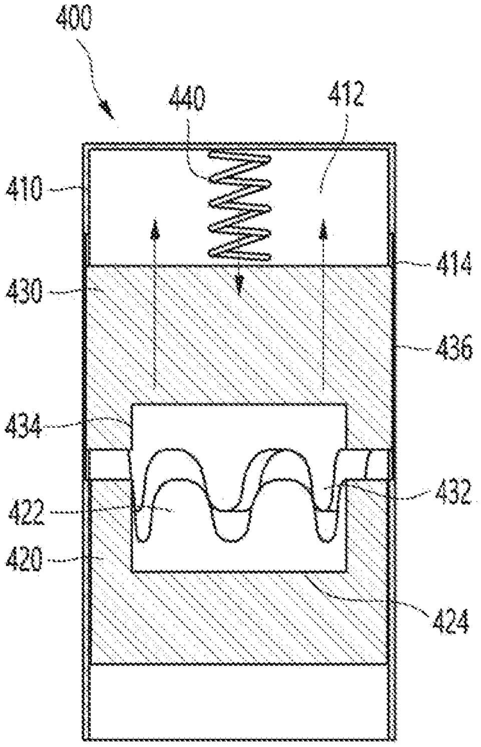
Figure 18:
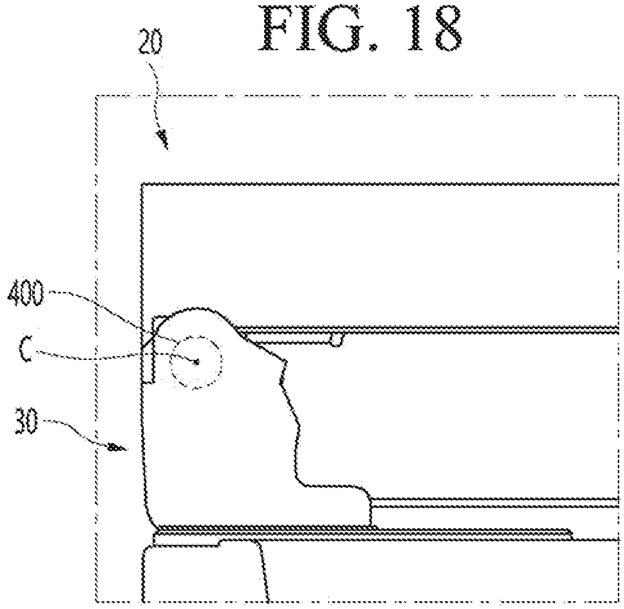
Figure 18:
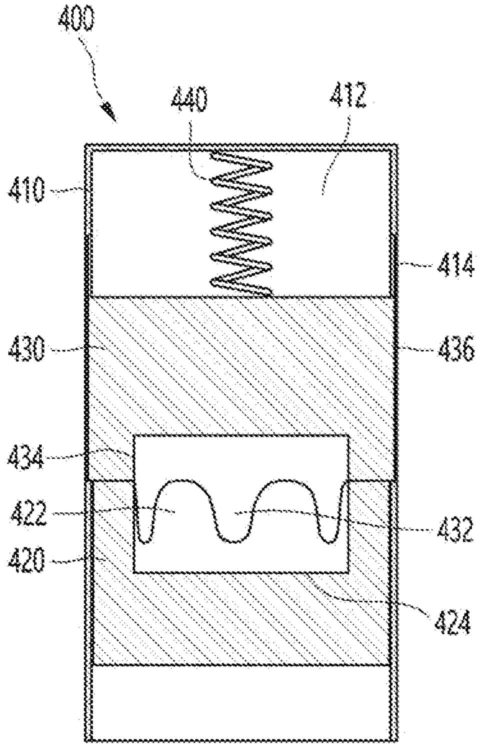

FIG. 15 illustrates a state where the door is closed at a first set angle, FIG. 16 illustrates a state where the door is closed at a second set angle, FIG. 17 illustrates a state where the door is closed at a third set angle, and FIG. 18 illustrates a state where the door is closed.

Referring to FIGS. 14 to 18, the damping mechanism 400 of the present embodiment may be installed on the door 20.

The damping mechanism 400 may include a case 410. The case 410 may be accommodated in the door 20.

The damping mechanism 400 may include a first member 420 accommodated in the case 410. The first member 420 may be connected to the first hinge shaft 131 or the second hinge shaft 33 described in the first embodiment.

When the door 20 rotates, the first member 420 may rotate within the case 410. In other words, the first member 420 may rotate relative to the case 410.

The damping mechanism 400 may further include a second member 430 accommodated in the case 410. The second member 430 may move relative to the first member 420. The second member 430 may contact the first member 420.

The second member 430 may move linearly within the case 410 when the first member 420 rotates. For example, with reference to FIG. 14, the second member 430 is capable of moving up and down.

The first member 420 may include a first space 424 capable of accommodating oil. The second member 430 may include a second space 434 capable of accommodating oil.

For example, the first space 424 may be recessed in a direction away from the second member 430. For example, the second space 434 may be recessed in a direction away from the first member 420.

To enable linear movement of the second member 430 when the first member 420 rotates, the first member 420 may include a first uneven part 422, and the second member 430 may include a second uneven part 432.

The first uneven part 422 may include a plurality of concave parts and a plurality of convex parts disposed alternately. The second uneven part 432 may include a plurality of concave parts and a plurality of convex parts disposed alternately.

According to the rotational position of the first member 420, the convex part of the first uneven part 422 may be accommodated in the concave part of the second uneven part 432. The convex part of the second uneven part 432 may be accommodated in the concave part of the first uneven part 422.

According to the rotational position of the first member 420, the convex part of the first uneven part 422 may contact the convex part of the second uneven part 432. According to the shapes of the first uneven part 422 and the second uneven part 432, the linear movement distance of the second member 430 according to rotation of the first member 420 may vary.

The damping mechanism 400 may further include an elastic member 440 that elastically supports the second member 430.

When the door 20 is closed, the convex part of the first uneven part 422 may be maintained in a state accommodated in the concave part of the second uneven part 432 by the clastic force of the elastic member 440, as illustrated in FIG. 14.

The second member 430 and the case 410 may form a buffer space 412 in which oil is accommodated. The elastic member 440 may be located in the buffer space 412.

The case 410 may be provided with a rotation guide that guides the rotation of the first member 420. The rotation guide guides the rotation of the first member 420, while restricting the linear movement of the first member 420.

A protrusion 436 extending in the longitudinal direction of the second member 430 (or the arrangement direction of the first member and the second member) may be formed on the second member 430. A guide groove 414 in which the protrusion 436 is accommodated may be formed on the inner circumferential surface of the case 410.

While the protrusion 436 is accommodated in the guide groove 414, the protrusion 436 may move along the guide groove 414. Rotation of the second member 430 is limited by the guide groove 414 and the protrusion 436 and linear movement may be performed stably.

The first member 420 may rotate in both directions in the case 410.

The position of the second member in FIG. 14 or FIG. 18 may be referred to as a first position. The position of the second member in FIG. 16 may be referred to as a second position.

Damping force may be generated while the second member 430 moves from the first position to the second position.

When the second member 430 moves in the first direction from the first position to the second position, the elastic member 440 contracts and the oil in the buffer space 412 may flow into the first space 424 or the second space 424 through an orifice formed in the second member 430 or through the portion between the second member 430 and the inner circumferential surface of the case 410.

Damping force may be generated in the process of oil flowing from the buffer space 412 to the first space 424 or the second space 424.

In the process of opening the door 20 by a second set angle in a closed state, the first member 420 may rotate in one direction. Then, the second member 430 can move from the first position to the second position. Accordingly, when the door 20 is opened by the second set angle in a closed state, a damping force may be applied to the door 20.

In other words, in the present embodiment, a damping force is generated on the door 20 even in the process of opening the door 20, thereby limiting sudden opening of the door 20.

As illustrated in FIG. 15, when the door 20 is opened at a first set angle that is greater than the second set angle, the first member 420 may additionally rotate in the one direction. In this case, the second member 430 may move from the second position back to the first position. When the second member 430 moves from the second position to the first position, the damping force may not be applied or the damping force may be reduced.

On the other hand, in a state where the door 20 is opened at an angle greater than the first set angle, the door 20 may be rotated in another direction to close the door 20. Then, the second member 430 may move from the position in FIG. 15 to the second position in FIG. 16.

Accordingly, a damping force may be applied to the door 20 during a door 20 closing process. When the door 20 is closed from the first set angle to the second set angle, a damping force is applied to the door 20 to prevent the door 20 from suddenly closing.

In addition, as illustrated in FIG. 17, when the door 20 is rotated at an angle less than the second set angle, the damping force of the damping mechanism 400 is reduced or disappears, so as illustrated in FIG. 18, the door 20 can be completely closed.

In the present embodiment, a damping force is generated in the damping mechanism 400 when the door 20 is opened and when the door 20 is closed, respectively. However, the angle section in which the damping force is generated when the door 20 is closed may be different from the angle section in which the damping force is generated when the door 20 is opened. In other words, the damping mechanism may generate a damping force within a first angle range when the door is opened and may generate a damping force within a second angle range when the door is closed.

For example, the first angle range may be 0 degrees or more and A degrees or less. The second angle range may be B degrees or more and C degrees or less. At this time, B degrees may be greater than A degrees.

Unlike the above description, a damping force may be generated in the process of moving the second member from the second position to the first position through changes in the direction of force of the clastic member 440 or the flow amount of oil, or the like.

For example, it is possible for the damping mechanism 400 to be designed so that the damping force operates in the process of moving from the second position of the second member in FIG. 16 to the first position of the second member in FIG. 17. In this case as well, when the door 20 is opened and when the door 20 is closed, a damping force is generated in the damping mechanism 400, respectively, and when the door 20 is closed, the damping force may be different from the damping force when the door is opened. The angular section in which the damping force is generated when the door 20 is closed (the section in which the second member moves from the second position to the first position) may be different from the angle section in which the damping force is generated when the door 20 is opened. In other words, the damping mechanism may generate a damping force within a first angle range when the door is closed and may generate a damping force within a second angle range when the door is opened. For example, the first angle range may be 0 degrees or more and A1 degrees or less. The second angle range may be B1 degrees or more and C1 degrees or less. At this time, B1 degrees may be greater than A1 degrees.

Figure 19:
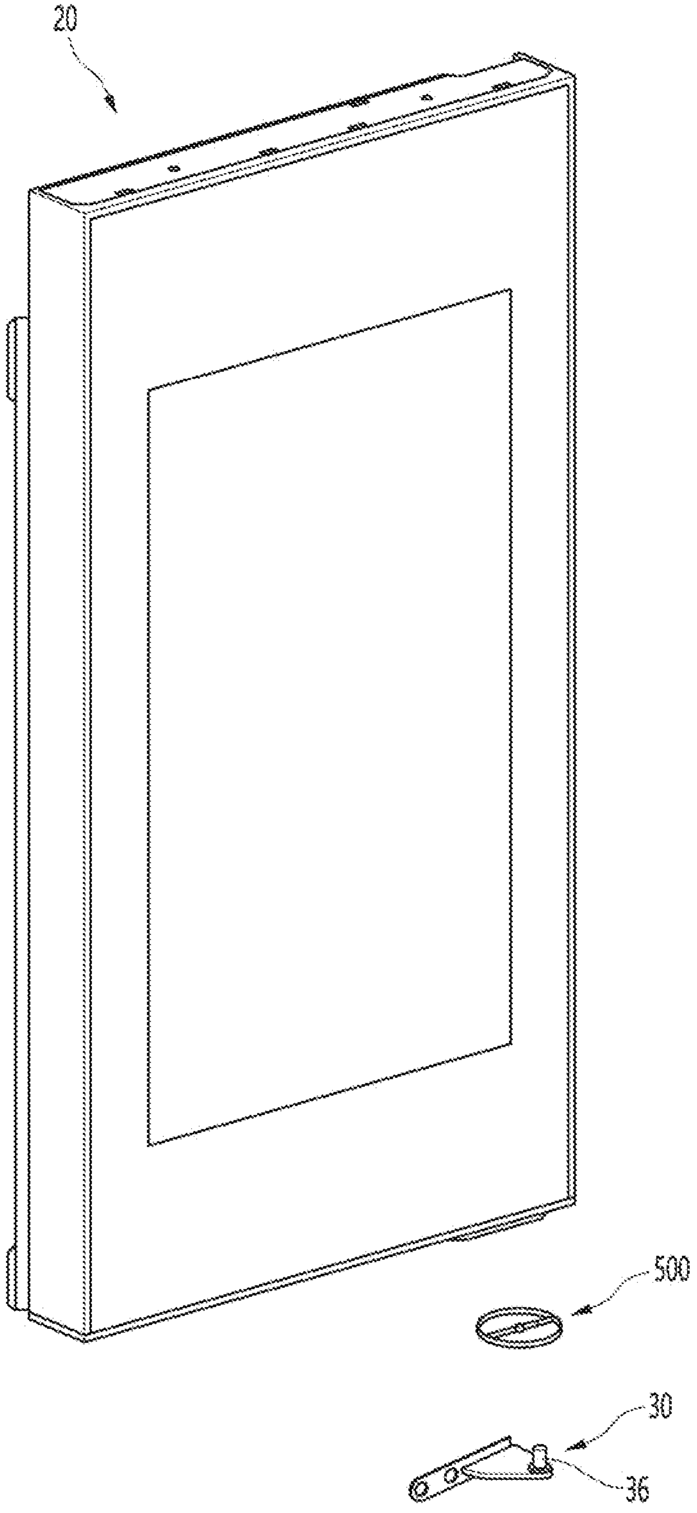
FIG. 19 is a view illustrating a door and a damping mechanism according to the fourth embodiment.
Figure 20:
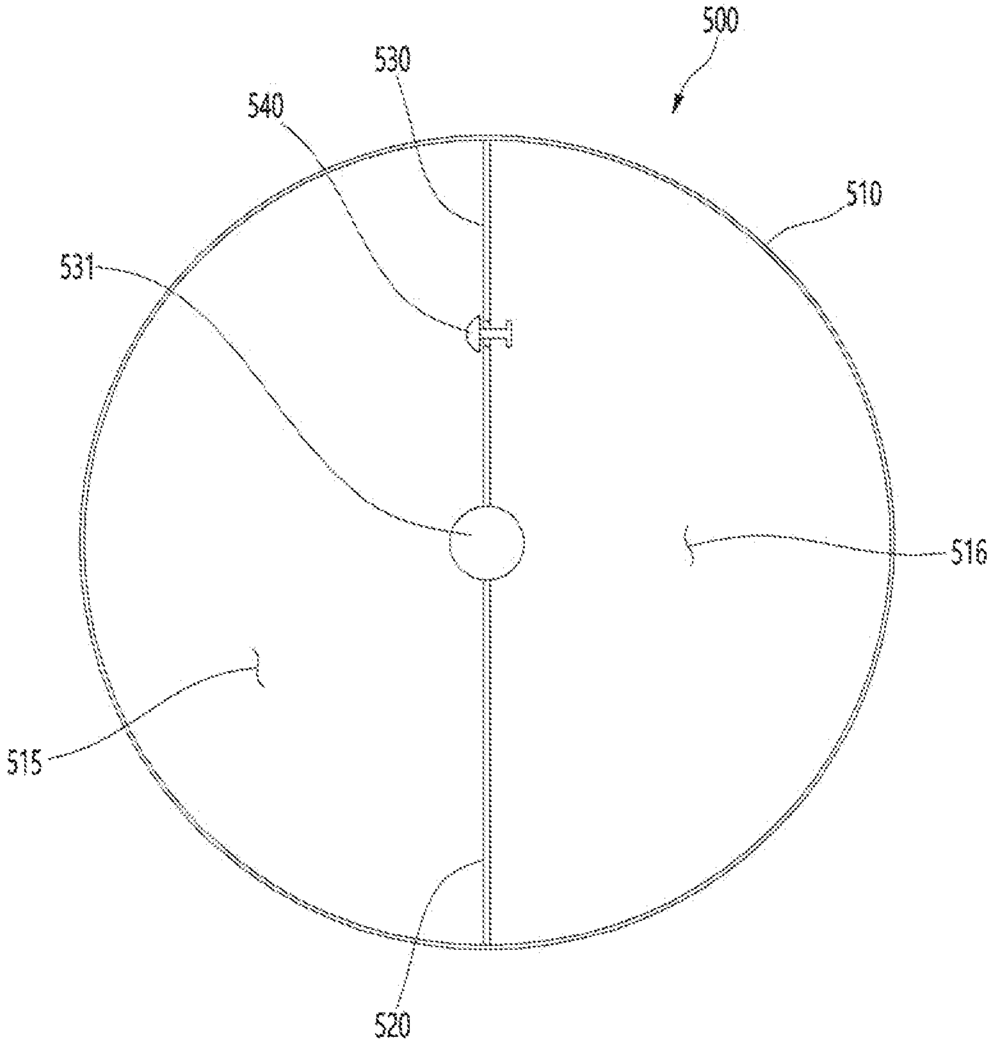
FIG. 20 is a plan view illustrating a damping mechanism according to the fourth embodiment.
Figure 21:
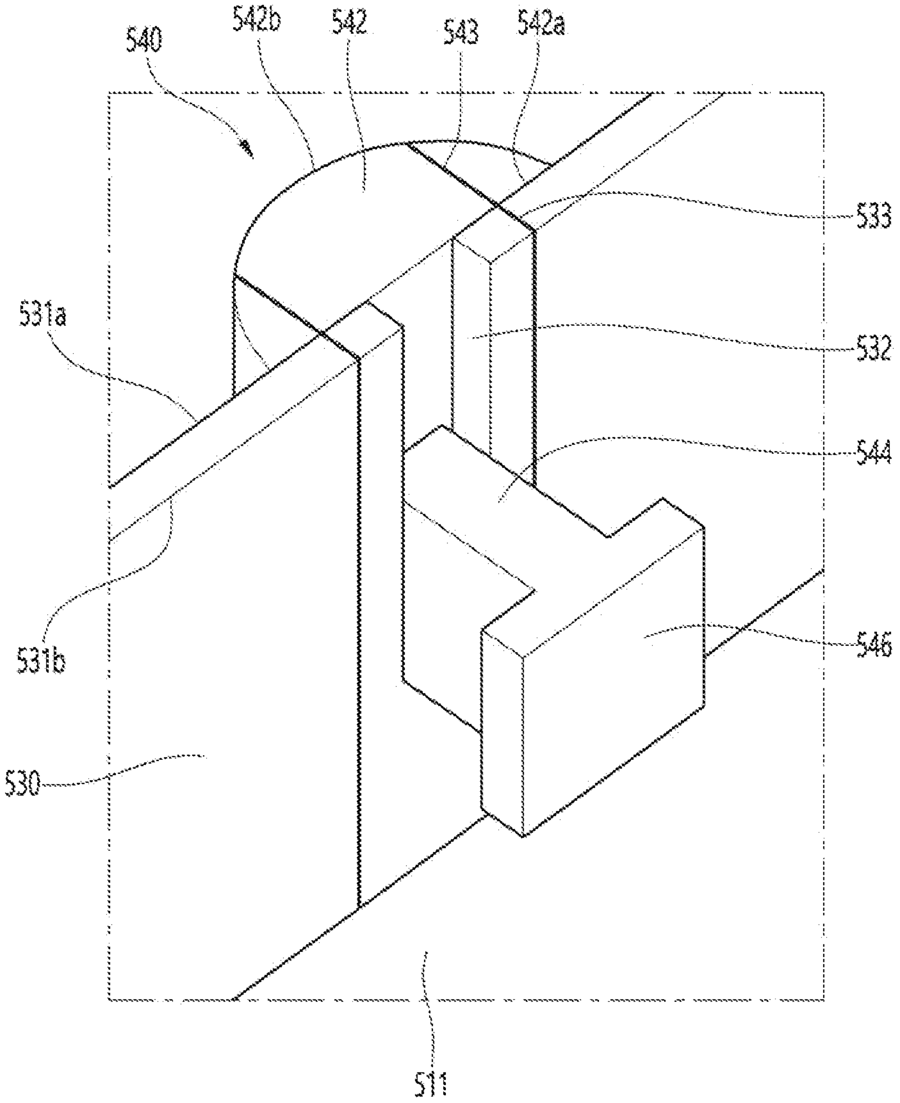
FIG. 21 is a view illustrating a state where a valve is coupled to a movable wall according to the fourth embodiment.

FIG. 19 is a view illustrating a door and a damping mechanism according to the fourth embodiment, FIG. 20 is a plan view illustrating a damping mechanism according to the fourth embodiment, and FIG. 21 is a view illustrating a state where a valve is coupled to a movable wall according to the fourth embodiment.

Referring to FIGS. 19 to 21, the damping mechanism 500 of the present embodiment may be installed on the upper or lower side of the door 20. The damping mechanism 500 may be connected to the hinge 30 provided on the lower side of the door 20 or may be connected to the hinge provided on the upper side.

Hereinafter, it will be described as an example that the damping mechanism 500 is connected to the hinge shaft 36 of the hinge 30 provided on the lower side of the door 20.

The damping mechanism 500 may include a case 510. The case 510 may be formed in a cylindrical shape, for example.

Oil may be provided inside the case 510, and the case 510 may be sealed. In the present embodiment, the case 510 can be sealed to prevent oil from leaking while allowing the movement of the movable wall 530, which will be described later.

The damping mechanism 500 may include a fixed wall 520 provided in the case 510 and a movable wall 530 that can move with respect to the fixed wall 520.

The movable wall 530 may include a shaft 531. The shaft 531 may be connected to the hinge shaft 36. Accordingly, the movable wall 530 can be rotated, for example.

The internal space of the case 510 may be divided into a first space 515 and a second space 516 by the fixed wall 520 and the movable wall 530. The volume of the first space 515 and the volume of the second space 516 may be changed by rotation of the movable wall 530. Oil may be provided in each of the first space 515 and the second space 516.

A valve 540 may be coupled to the movable wall 530. The valve 540 may be movably coupled to the movable wall 530.

According to the position of the valve 540, the flow of oil within the case 510 may be controlled.

The movable wall 530 may include a slot 532 to which the valve 540 is coupled. The valve 540 may restrict the oil flow into the slot 532 when the movable wall 530 rotates in one direction and may allow the oil flow into the slot 532 when the movable wall 530 rotates in the other direction.

For example, the slot 532 may be formed by recessing downward from the upper surface of the movable wall 530. A portion of the valve 540 may be inserted into the slot 532.

The valve 540 may include a first portion 542. The first portion 542 may be located on one side of the movable wall 530. For example, the first portion 542 may be located in the first space 515.

The first portion 542 may include a contact surface 542*a* that can contact the first surface 531*a* of the movable wall 530.

The height of the first portion 542 may be the same as the height of the movable wall 530. The upper end of the first portion 542 may be disposed at the same height as the upper end of the movable wall 530.

The first surface 531*a* of the movable wall 530 may form the first space 515. The horizontal length of the contact surface 542*a* (for example, the length in the first direction in which the movable wall extends from the shaft) may be greater than the horizontal width of the slot 532. Accordingly, when the contact surface 542*a* contacts the first surface 531*a* of the movable wall 530, the contact surface 542*a* may cover the slot 532.

The first portion 542 may further include a non-contact surface 542*b* (or circumferential surface) extending from the contact surface 542*a*. For example, the contact surface 542*a* may be a flat surface, and the non-contact surface 542*b* may be a round surface.

The valve 540 may further include a second portion 544 extending from the first portion 542. The second portion 544 may be inserted into the slot 532. The vertical length of the second portion 544 may be less than the vertical length of the slot 532.

The upper surface of the second portion 544 may be located lower than the upper end of the slot 532. Alternatively, the upper surface of the second portion 544 may be positioned at the same height as the upper end of the slot 532, and the lower surface of the second part 544 may be positioned higher than the lower end of the slot 532.

The length (horizontal length in a direction crossing the first direction) of the second portion 544 may be greater than the thickness of the movable wall 530.

The valve 540 may further include a third portion 546 extending from the second portion 544. The third portion 546 may be located on the other side of the movable wall 540. The second portion 544 may be located in the slot 532 and may connect the first portion 542 and the third portion 546.

The distance between the first portion 542 and the third portion 546 is determined by the length of the second portion 544 and may be greater than the thickness of the movable wall 530.

The horizontal length (horizontal length in the first direction) of the third portion 546 may be greater than the horizontal width of the slot 532.

During the movement of the movable wall 530, the third portion 546 may contact the second surface 531*b* of the movable wall 530. The second surface 531*b* of the movable wall 530 is opposite to the first surface 531*a* and may form the second space 516.

When the third portion 546 is in contact with the second surface 531*b* of the movable wall 530, the contact surface 542*a* of the first portion 542 may be spaced apart from the first surface 531*a*.

A first flow path 543, which is a passage for oil to move, may be formed in the first portion 542. For example, the first flow path 543 may be formed by recessing the upper surface of the first portion 542 or may be formed by penetrating the first portion 542.

A second flow path 533, which is a passage for oil to move, may be formed in the movable wall 530.

A portion of the second flow path 533 may be formed on the upper surface of the movable wall 530 or may be formed through the movable wall 530. Another portion of the second flow path 533 may be formed on the second surface 531*b* of the movable wall 530. Of course, it is also possible that the second flow path 533 is formed only on the upper surface of the movable wall 530.

The first flow path 543 and the second flow path 533 may be in communication while the contact surface 542*a* of the first portion 542 is in contact with the first surface 531*a* of the movable wall 530.

Figure 22:
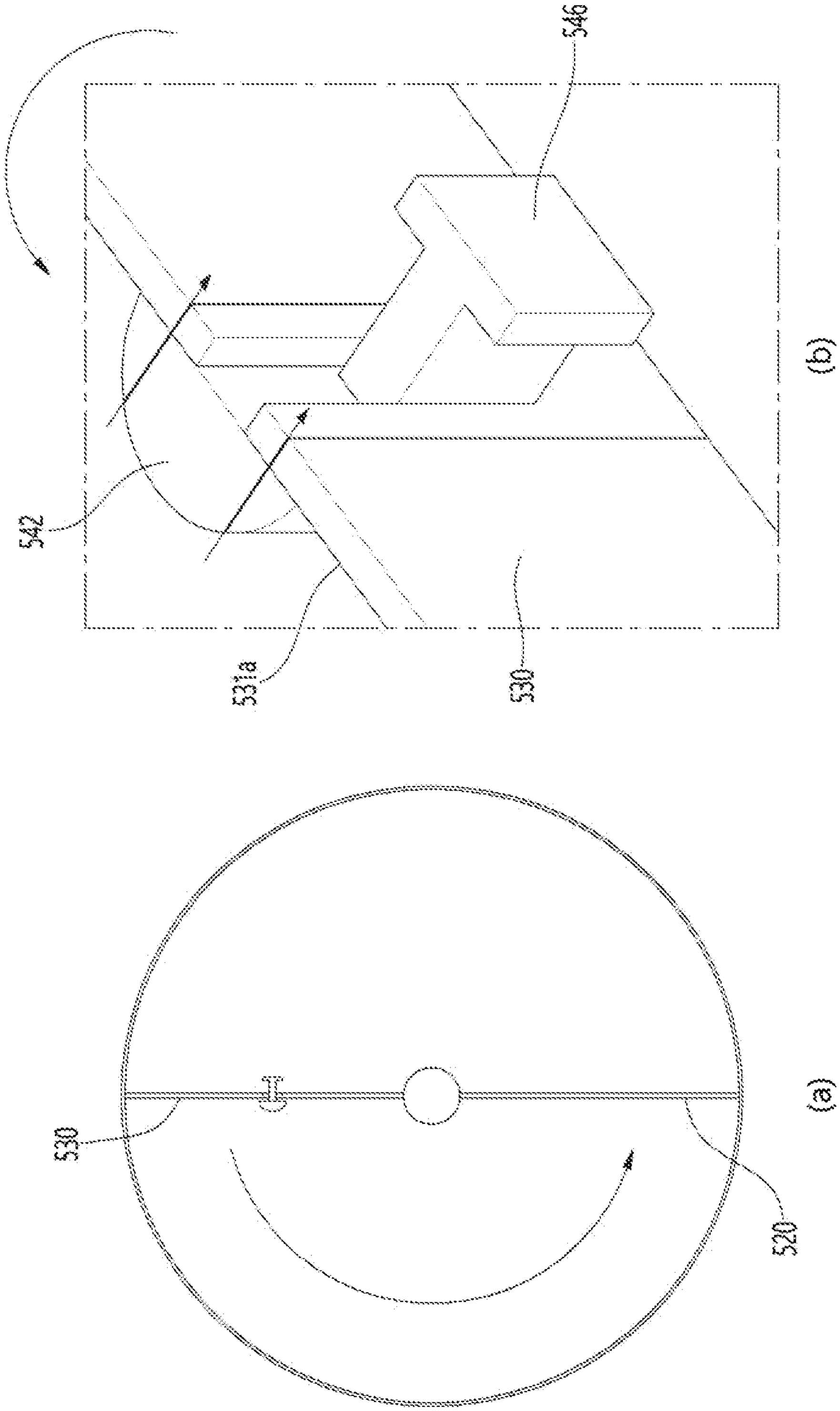
FIG. 22 is a view illustrating oil flow when the movable wall according to the fourth embodiment is rotated in one direction.
Figure 23:
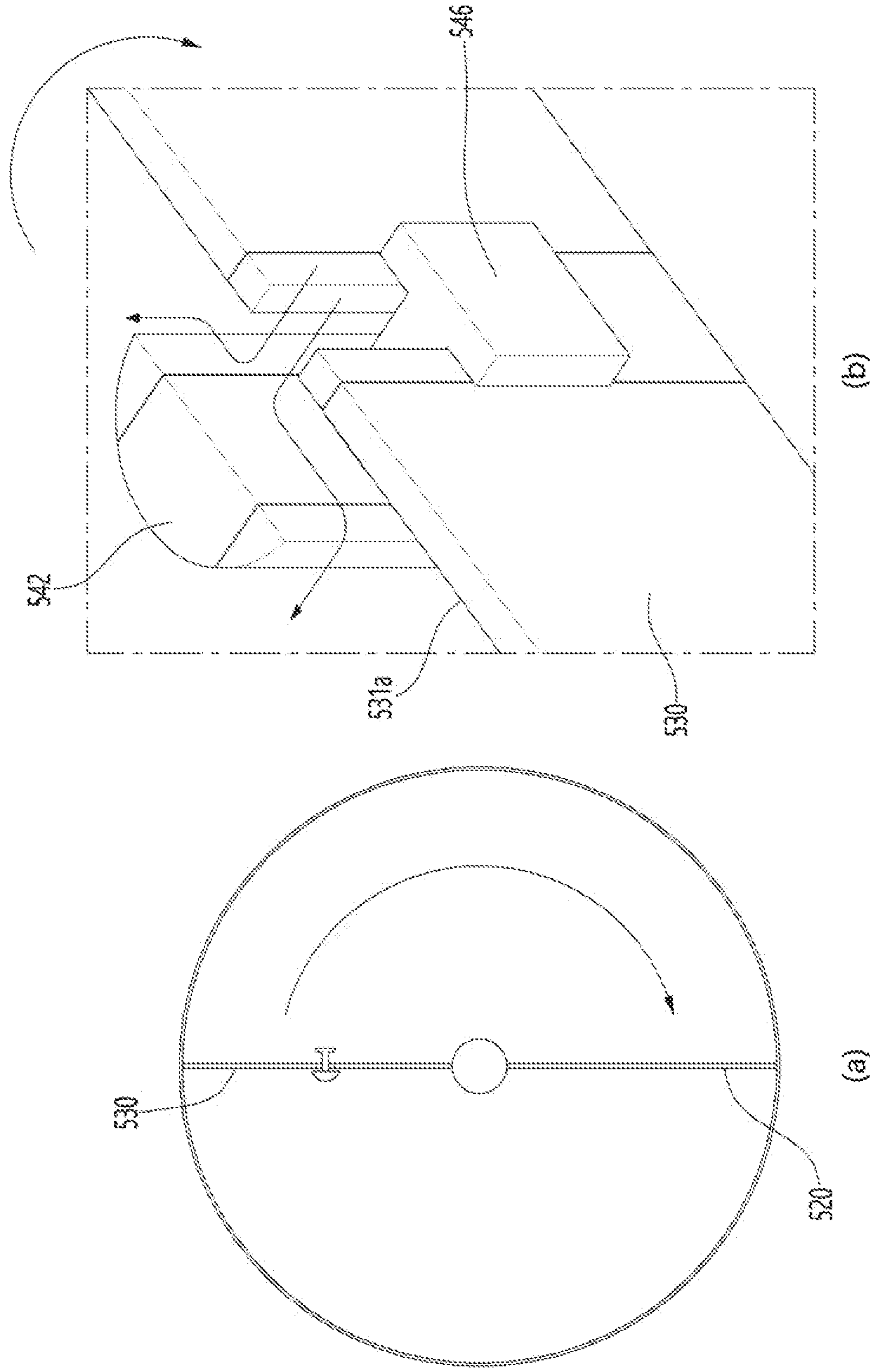
FIG. 23 is a view illustrating oil flow when the movable wall according to the fourth embodiment is rotated in another direction.

FIG. 22 is a view illustrating oil flow when the movable wall according to the fourth embodiment is rotated in one direction, and FIG. 23 is a view illustrating oil flow when the movable wall according to the fourth embodiment is rotated in another direction.

FIGS. 24 to 27 are views illustrating the state of the damping mechanism according to the rotation of the door according to the fourth embodiment.

Figure 24:
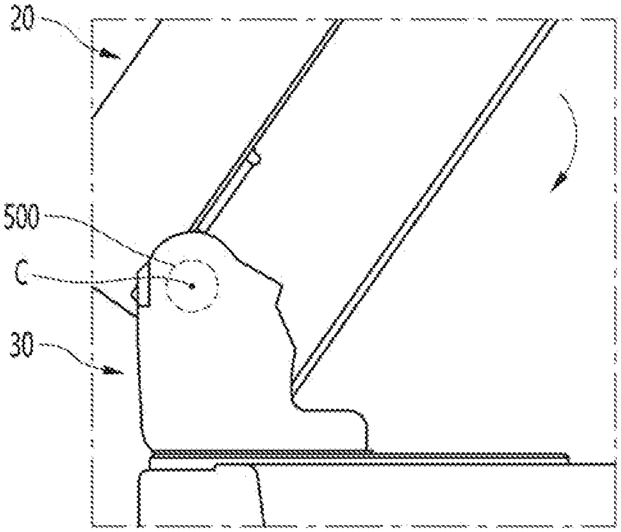
FIGS. 24 to 27 are views illustrating the state of the damping mechanism according to the rotation of the door according to the fourth embodiment.
Figure 24:
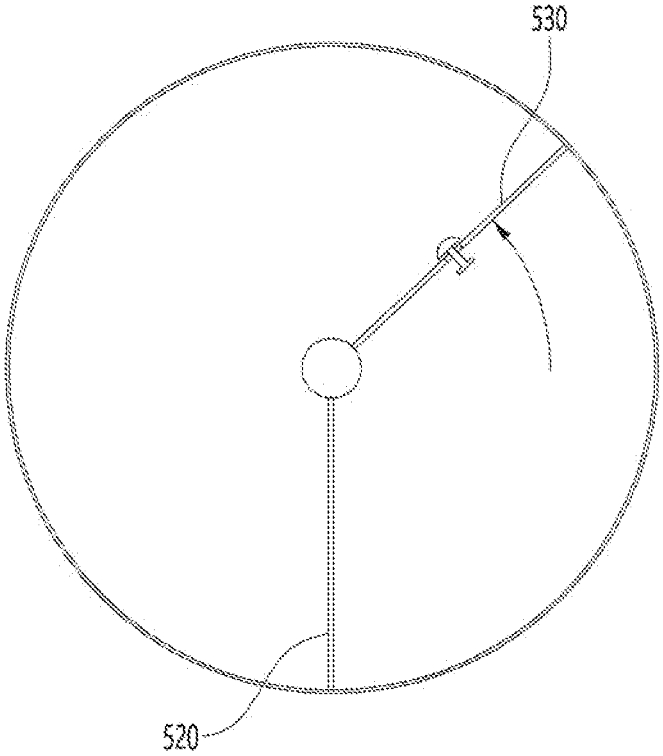
Figure 25:
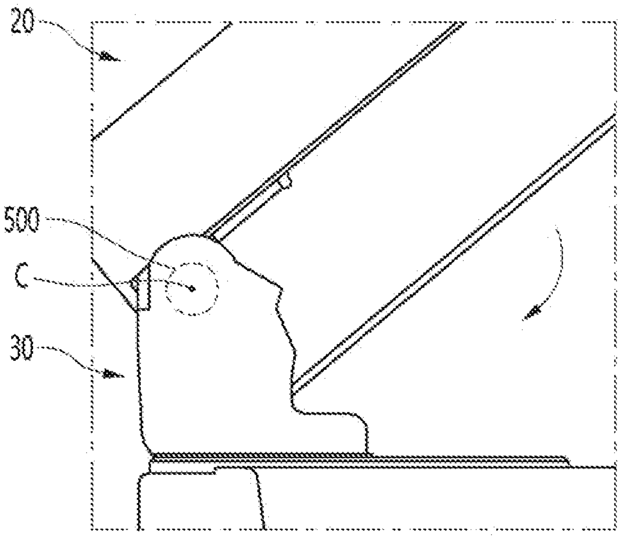
Figure 25:
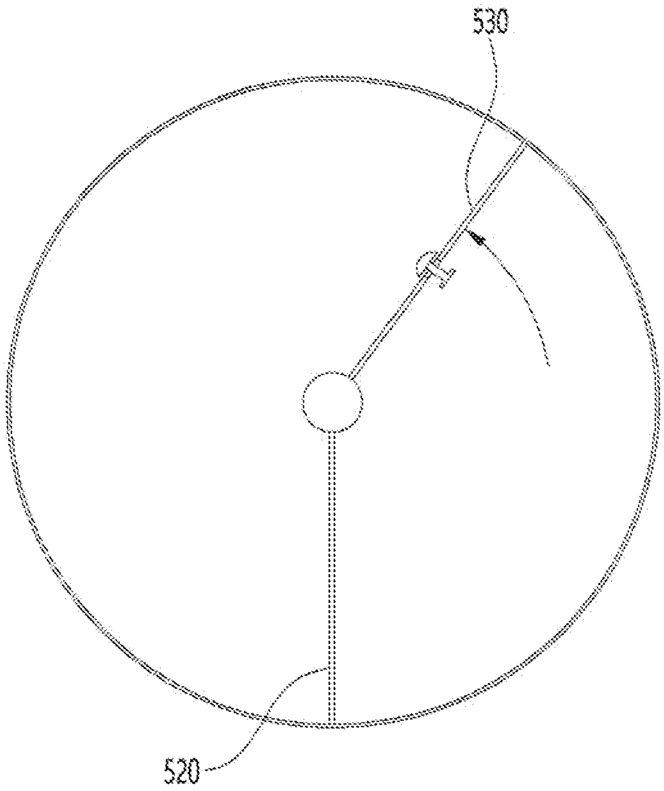
Figure 26:
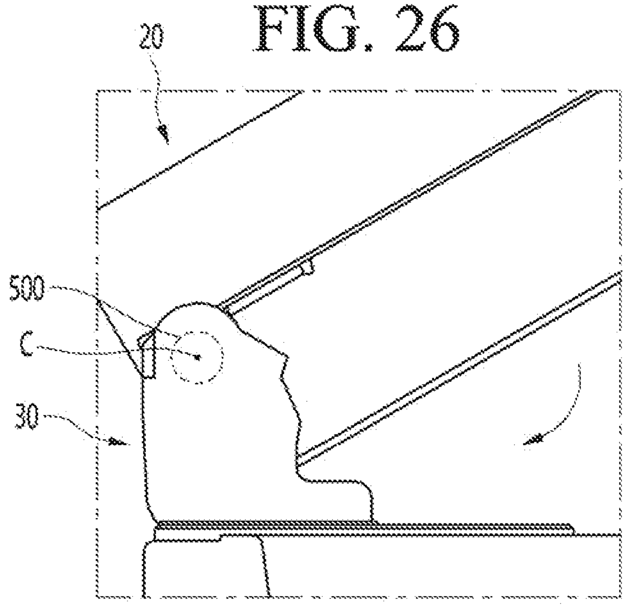
Figure 26:
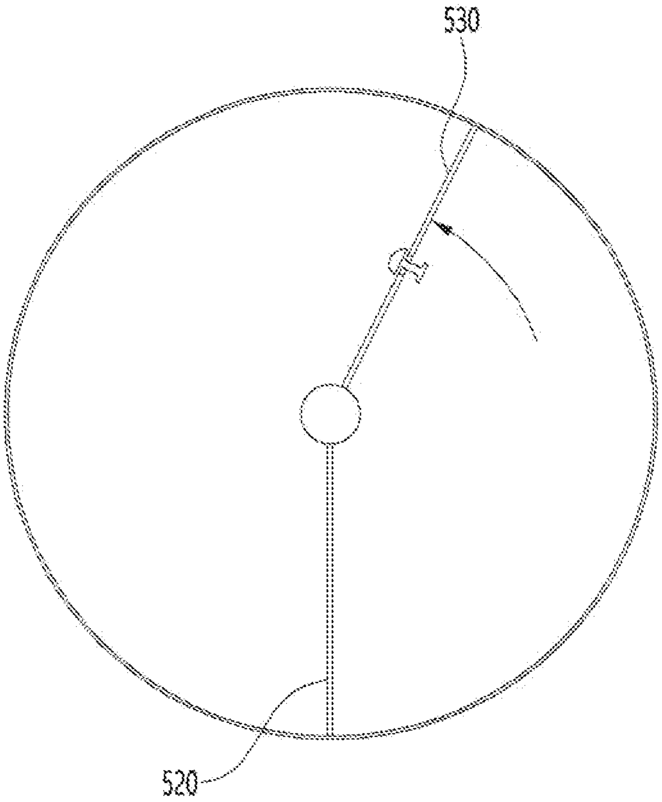
Figure 27:
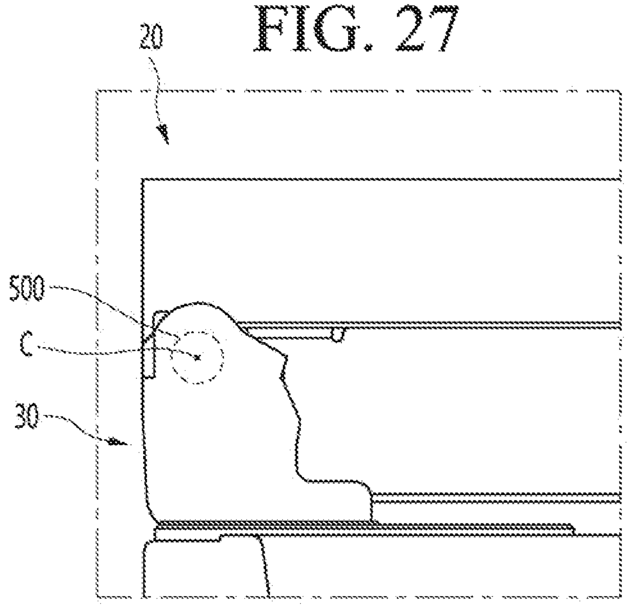
Figure 27:
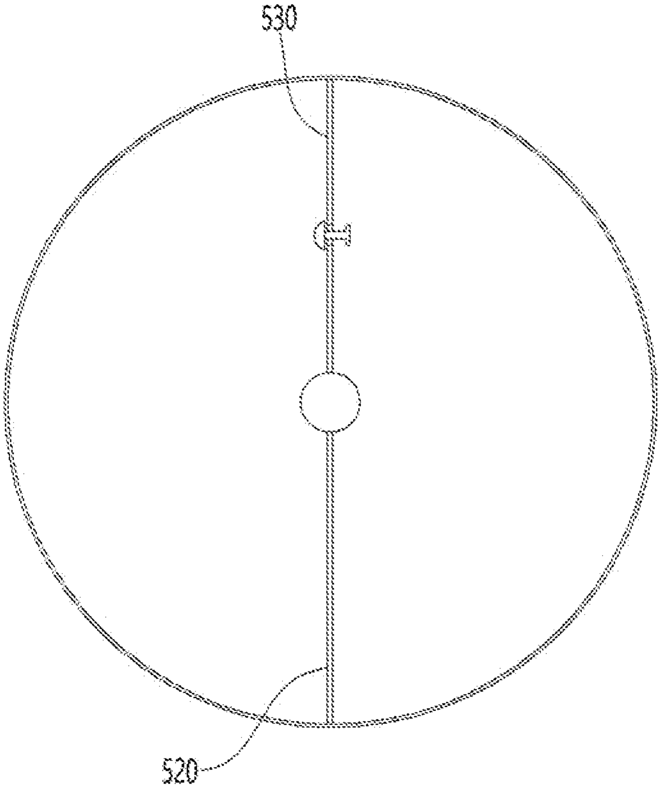

FIG. 24 illustrates a state where the door is closed at a first set angle, FIG. 25 illustrates a state where the door is closed at a second set angle, FIG. 26 illustrates a state where the door is closed at a third set angle, and FIG. 27 illustrates a state where the door is completely closed.

Referring to FIGS. 19 to 27, in the process of rotating the movable wall 530 in one direction (counterclockwise with respect to FIG. 22), the contact surface 542*a* of the first portion 542 may be in contact with the first surface 531*a* of the movable wall 530. For example, when the door 20 is closed, the movable wall 530 may be rotated in the one direction.

When the contact surface 542*a* of the first portion 542 is in contact with the first surface 531*a* of the movable wall 530, the contact surface 542*a* of the first portion 542 covers the slot 532.

In this state, when the movable wall 530 is rotated in the one direction, the valve 540 is also rotated in one direction in a state where the contact surface 542*a* of the first portion 542 is in contact with the first surface 531*a* of the movable wall 530.

Oil in the first space 515 moves to the second space 516 through the first flow path 543 and the second flow path 533.

The oil in the first space 515 flows at a constant flow rate along the flow paths 543 and 533, thereby providing a constant oil resistance. This oil resistance acts as a damping force.

According to the amount of oil filled in the first space 515, the angle section in which the damping force acts when the door 20 is closed may be determined. Additionally, the size of the damping force may be determined by adjusting the size of the cross-sectional area of the flow paths 543 and 533.

On the other hand, as illustrated in FIG. 23, in the process of rotating the movable wall 530 in the other direction (clockwise with respect to FIG. 23), the first surface 531*a* of the movable wall 530 may be spaced apart from the contact surface 542*a* the first portion 542. In this case, the slot 532 may be opened.

For example, when the door 20 is opened, the movable wall 530 may be rotated in the other direction.

When the first surface 531*a* of the movable wall 530 is spaced apart from the contact surface 542*a* of the first portion 542, oil in the second space 516 flows into the first space 515 through the slot 532. Accordingly, a small damping force may be generated in the damping mechanism, or no damping force may be generated in the damping mechanism.

In the process of rotating the movable wall 530 in another direction, the second surface 531*b* of the movable wall 530 may contact the third portion 546. In this state, when the movable wall 530 is further rotated in the other direction, the valve 540 may move together with the movable wall 530.

Meanwhile, as illustrated in FIG. 24, when the door 20 is closed after being opened at the first set angle or more, the movable wall 530 may be rotated in the one direction.

In the process of rotating the movable wall 530 in one direction, the first surface 531*a* of the movable wall 530 is in contact with the contact surface 542*a* of the first portion 542.

During the door 20 closing process, the point at which the first surface 531*a* of the movable wall 530 is in contact with the contact surface 542*a* of the first part 542 may be the point at which damping force is generated and may be determined by the amount of oil in the case 510, the size of the slot 532, or the like.

For example, as illustrated in FIG. 25, when the door 20 is closed by the second set angle, the first surface 531*a* of the movable wall 530 contacts the contact surface 542*a* of the first portion 542, or, as illustrated in FIG. 26, the first surface 531*a* of the movable wall 530 may contact the contact surface 542*a* of the first portion 542 when the door 20 is closed by a third set angle.

After the first surface 531*a* of the movable wall 530 is in contact with the contact surface 542*a* of the first portion 542, a damping force is generated when the movable wall 530 is rotated in one direction.

Figure 28:
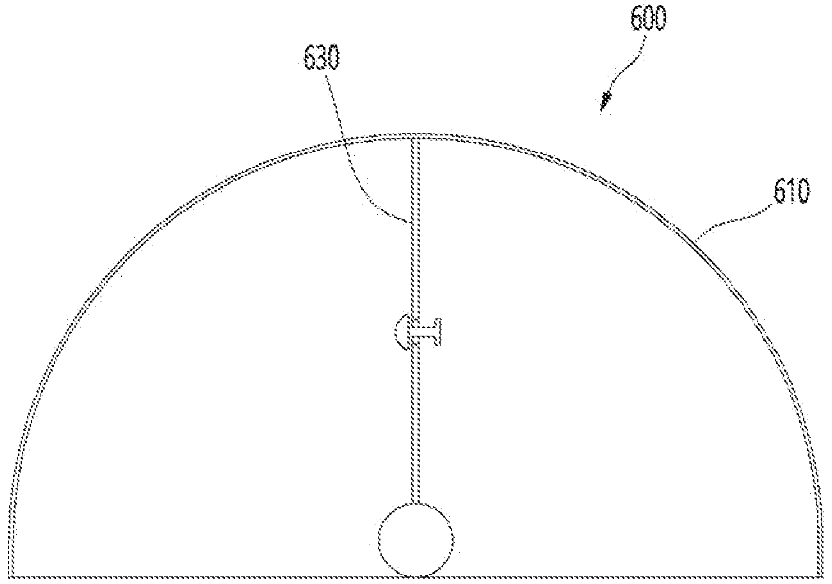
FIG. 28 is a view illustrating a modified example of the damping mechanism of FIG. 20.
Figure 29:
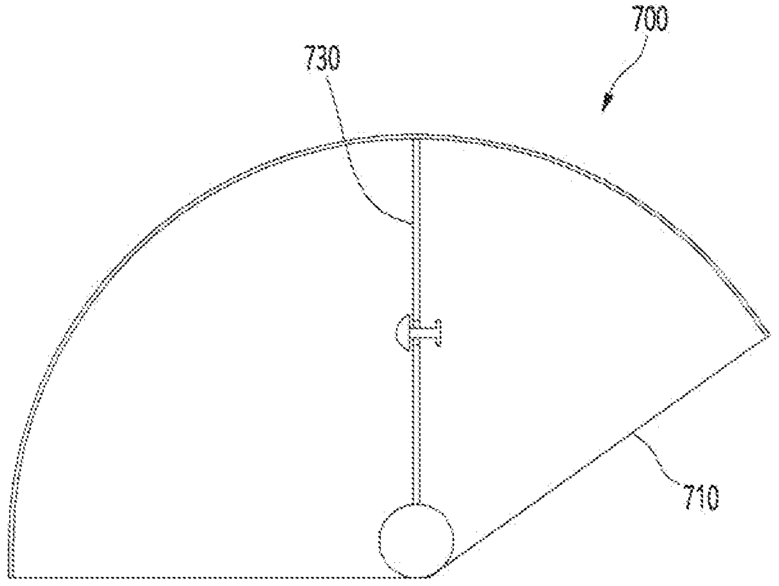
FIG. 29 is a view illustrating another modified example of the damping mechanism of FIG. 20.

FIG. 28 is a view illustrating a modified example of the damping mechanism of FIG. 20, and FIG. 29 is a view illustrating another modified example of the damping mechanism of FIG. 20.

Referring to FIG. 28, the case 610 of the damping mechanism 600 may be formed in a semicircular shape or a similar shape. In this case, a portion of the case 610 serves as a fixed wall. For example, the case 610 includes two fixed walls, and the movable wall 630 may move between the two fixed walls.

Referring to FIG. 29, the case 710 of the damping mechanism 700 may be formed in a fan-shaped shape or a similar shape. In this case, a portion of the case 710 serves as a fixed wall. For example, the case 710 includes two fixed walls, and the movable wall 730 may move between the two fixed walls.

FIGS. 30 to 33 are views illustrating the state of the damping mechanism according to the rotation of the door according to the fifth embodiment.

Figure 30:
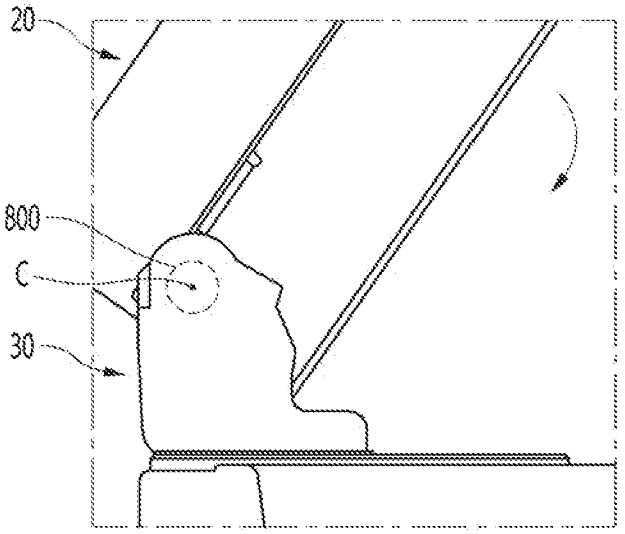
FIGS. 30 to 33 are views illustrating the state of the damping mechanism according to the rotation of the door according to the fifth embodiment.
Figure 30:
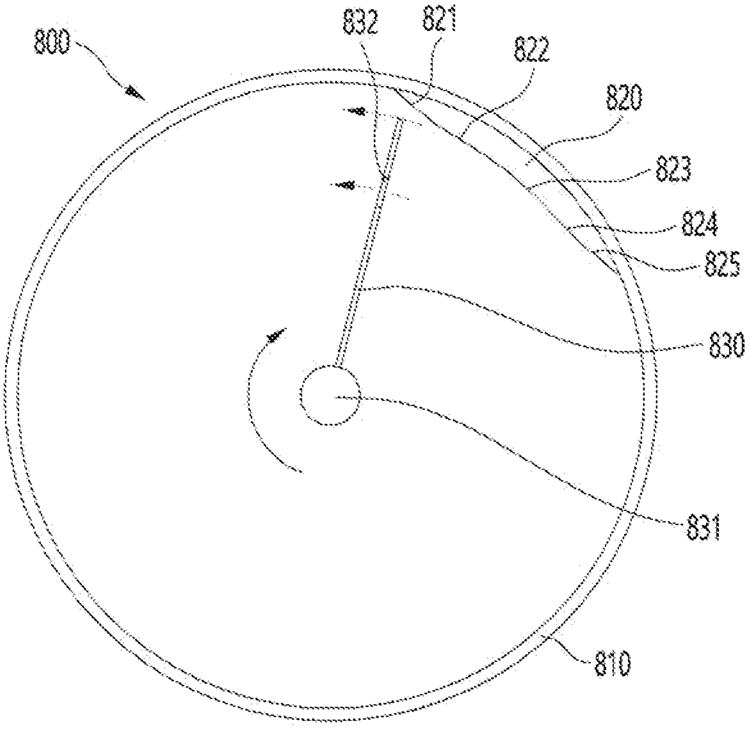
Figure 31:
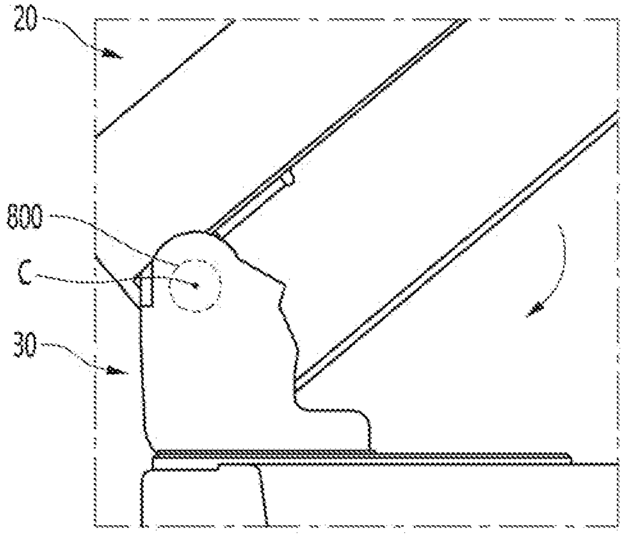
Figure 31:
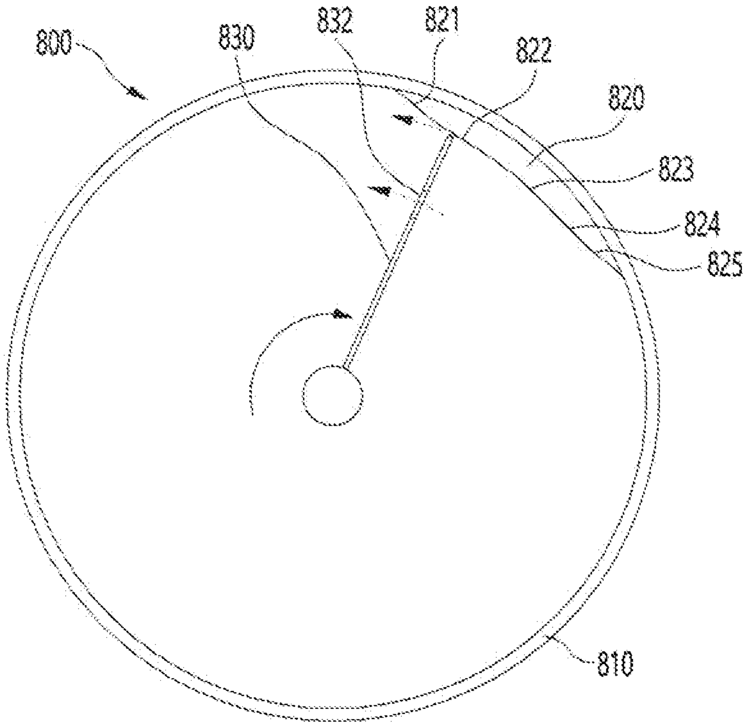
Figure 32:
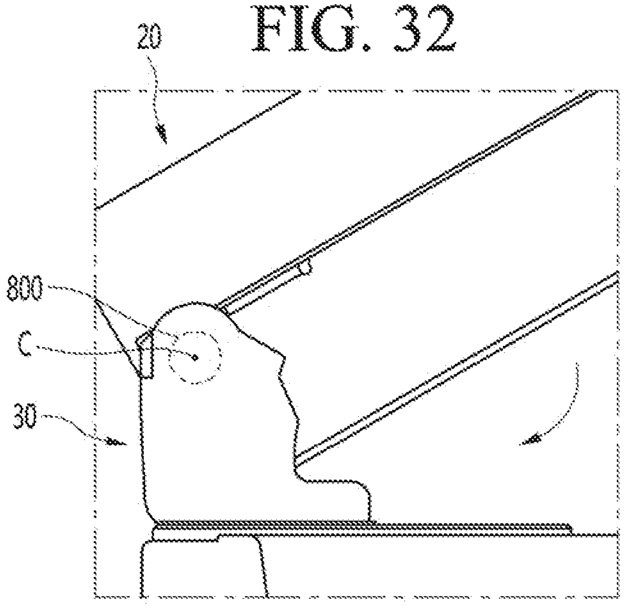
Figure 32:
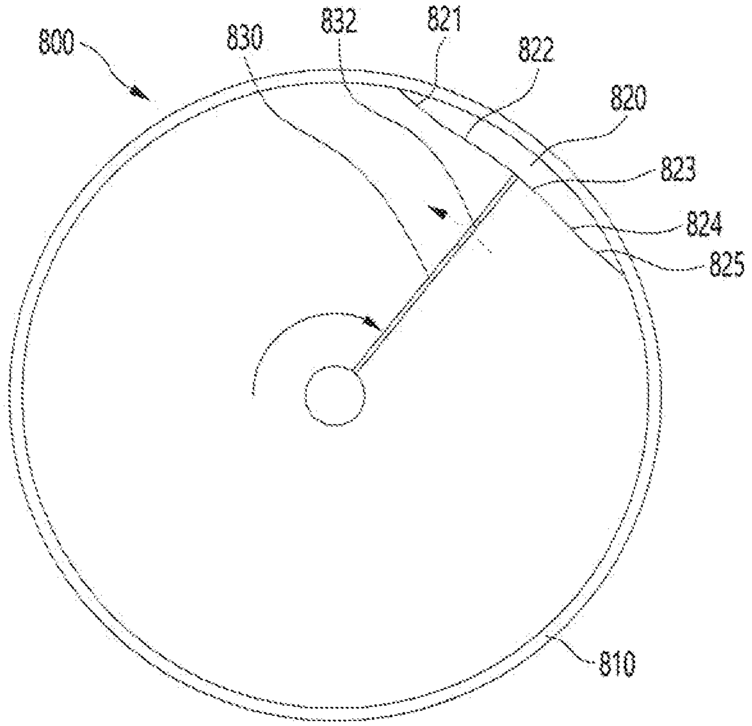
Figure 33:
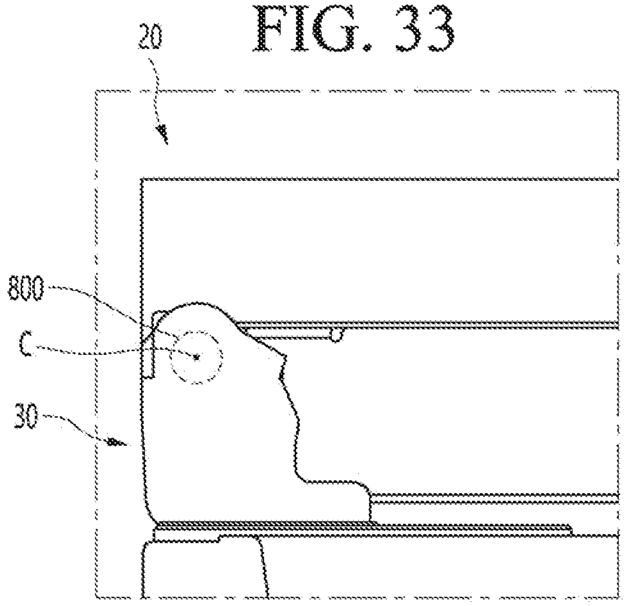
Figure 33:
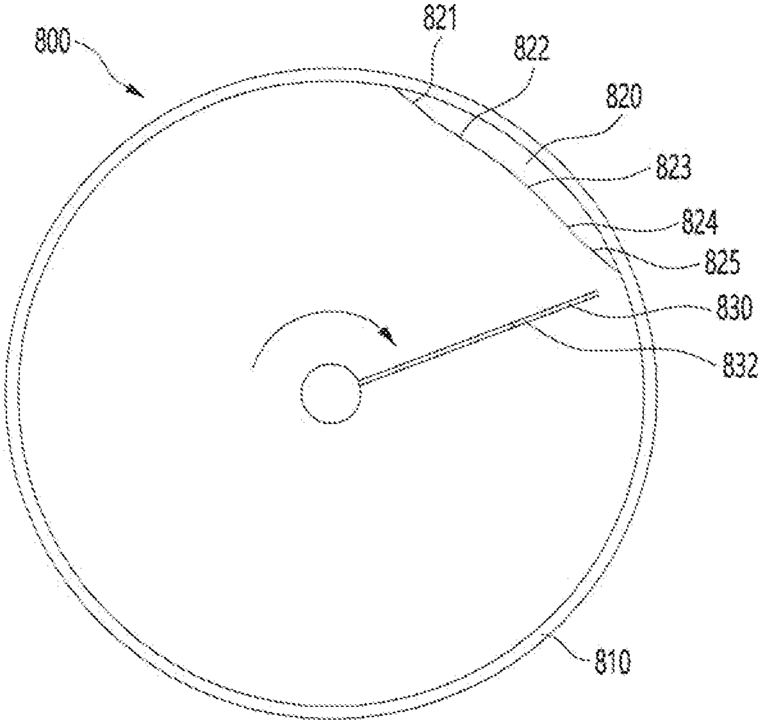

FIG. 30 illustrates a state where the door is closed at a first set angle, FIG. 31 illustrates a state where the door is closed at a second set angle, FIG. 32 illustrates a state where the door is closed at a third set angle, and FIG. 33 illustrates a state where the door is closed.

The present embodiment is a modified embodiment of the fourth embodiment.

Referring to FIGS. 30 to 33, the damping mechanism 800 of the present embodiment may include a case 810. The case 810 may be formed in a cylindrical shape, for example.

Alternatively, the case 810 may include a rounded portion. The rounded portion may be a portion corresponding to the movement path of the movable wall 830, which will be described later.

Oil may be provided inside the case 810, and the case 810 may be sealed. In the present embodiment, the case 810 can be sealed to prevent oil from leaking while allowing the movement of the movable wall 830, which will be described later.

The damping mechanism 800 may include a movable wall 830 movably disposed in the case 810.

The movable wall 830 may include a shaft 831. The shaft 831 may be connected to the hinge shaft 36. Accordingly, the movable wall 830 may be rotated, for example.

The movable wall 830 may be provided with a slot 832 for oil flow. The slot 832 may remain open or be opened and closed by a valve (which may be the same or similar to the valve in the fourth embodiment).

When there is no valve in the slot 832, the slot 832 may allow oil to flow regardless of the moving direction of the movable wall 830.

In order to vary the damping force in the present embodiment, the radius of the case 810 may be varied.

For example, a portion of the inner circumferential surface of the case 810 may protrude toward the shaft 831 of the movable wall 830. The portion protruding from the case 810 may be referred to as the protrusion 820.

A portion of the inner circumferential surface of the case 810 or the protrusion 820 may include a first portion 821 having a first radius.

When the movable wall 830 moves to a position corresponding to the first portion 821, the movable wall 830 may be spaced apart from the first portion 821. The movable wall 830 and the first portion 821 may be spaced apart by a first gap.

The protrusion 820 may include a second portion 822 having a second radius. The second portion 822 may extend from the first portion 821.

The radius of the second portion 822 may be less than the radius of the first portion 821.

When the movable wall 830 moves to a position corresponding to the second portion 822, the movable wall 830 may be spaced apart from the second portion 822. The movable wall 830 and the second portion 821 may be spaced apart by a second gap. The second gap may be less than the first gap. The radius of the second portion 822 may be constant or may decrease as it moves away from the first portion 821.

The protrusion 820 may include a third portion 823 having a third radius. The third portion 823 may extend from the second portion 822.

The radius of the third portion 823 may be less than the radius of the second portion 822.

When the movable wall 830 moves to a position corresponding to the third portion 823, the movable wall 830 may be spaced apart from or in contact with the third portion 823.

When the movable wall 830 is spaced apart from the third portion 823, the movable wall 830 and the third portion 821 may be spaced apart by a third gap. The third gap may be less than the second gap.

The protrusion 820 may include a fourth portion 824 having a fourth radius. The fourth portion 824 may extend from the third portion 823.

The radius of the fourth portion 824 may be greater than the radius of the third portion 823. The radius of the fourth portion 824 may be the same as or different from the radius of the second portion 822.

When the movable wall 830 moves to a position corresponding to the fourth portion 824, the movable wall 830 may be spaced apart from the fourth portion 824.

When the movable wall 830 is spaced apart from the fourth portion 824, the movable wall 830 and the fourth portion 824 may be spaced apart by a fourth gap. The fourth gap may be greater than the third gap. The fourth gap may be the same as or different from the second gap. The radius of the fourth portion 824 may be constant or may increase as it moves away from the third portion 823.

The protrusion 820 may include a fifth portion 825 having a fifth radius.

When the movable wall 830 moves to a position corresponding to the fifth portion 825, the movable wall 830 may be spaced apart from the fifth portion 825. The movable wall 830 and the fifth portion 825 may be spaced apart by a fifth gap. The fifth gap may be greater than the fourth gap.

When the door 20 is opened at an angle greater than the first set angle, the movable wall 830 may be located in the first section corresponding to the first portion 821 or may be located in a section in which the protrusion 820 is not present (the left section of the first section based on FIG. 30).

When the door 20 is closed, the movable wall 830 may rotate clockwise with respect to FIG. 30.

When the movable wall 830 moves in the first section, oil (indicated by a dotted line in the drawing) not only passes through the slot 832 of the movable wall 830, but also passes through first gap between the movable wall 830 and the first portion 821.

When the movable wall 830 moves in the first section, no damping force may be generated in the damping mechanism 800 or a first damping force may be generated.

When the door 20 is further rotated in the closing direction, the movable wall 830 may be positioned in the second section corresponding to the second portion 822, as illustrated in FIG. 30.

When the door 20 is closed while the movable wall 830 is located in the second section, a second damping force may be generated in the damping mechanism 800.

When the movable wall 830 moves in the second section, oil not only may pass through the slot 832 of the movable wall 830, but also pass through the second gap between the movable wall 830 and the second portion 822. The amount of oil passing through the second gap in the second section is less than the amount of oil passing through the first gap in the first section. Accordingly, the second damping force may be greater than the first damping force.

When the door 20 is further rotated in the closing direction, the movable wall 830 may be positioned in the third section corresponding to the third portion 823, as illustrated in FIG. 31. When the door 20 is closed while the movable wall 830 is located in the third section, a third damping force may be generated in the damping mechanism 800.

When the movable wall 830 moves in the third section, oil can only pass through the slot 832 of the movable wall 830. Accordingly, the third damping force may be greater than the second damping force.

Alternatively, when the movable wall 830 moves in the third section, the oil may pass through the slot 832 of the movable wall 830 and pass through the third gap between the movable wall 830 and the third section 822.

The amount of oil passing through the third gap in the third section is less than the amount of oil passing through the second gap in the second section. Accordingly, the third damping force may be greater than the second damping force.

When the door 20 is further rotated in the closing direction, the movable wall 830 may be positioned in the fourth section corresponding to the fourth portion 824.

When the door 20 is closed while the movable wall 830 is located in the fourth section, a fourth damping force may be generated in the damping mechanism 800.

When the movable wall 830 moves in the fourth section, oil not only may pass through the slot 832 of the movable wall 830, but also pass through the fourth gap between the movable wall 830 and the fourth portion 822. The amount of oil passing through the fourth gap in the fourth section is greater than the amount of oil passing through the third gap in the third section. Accordingly, the fourth damping force may be less than the third damping force. The fourth damping force may be greater than 0 or may be 0.

Before the movable wall 830 is completely closed, the movable wall 830 may pass through a fifth section corresponding to the fifth portion 825 as illustrated in FIG. 32, and when the movable wall 830 is completely closed, the movable wall 830 may be located outside the fifth section.

In the present embodiment, the damping force may be increased and then decreased before the door closes. In this case, the door can be completely closed while sudden closing of the door is limited.

Above, it was explained that the protrusion includes five portions, but otherwise, it is also possible to include at least two portions with different radii. For example, the first portion may be a portion where the radius is reduced and the second portion may be a portion where the radius is increased. Alternatively, it is possible for the protrusion to include a first portion whose radius is reduced, a second portion whose radius is maintained, and a third portion whose radius is reduced.

The damping force by the damping mechanism 800 may be increased and then decreased. Alternatively, the damping force of the damping mechanism 800 may be increased step by step. Alternatively, the damping force of the damping mechanism 800 may be gradually reduced.

What is claimed is:

1. A refrigerator comprising:

a cabinet having a storage space;

a door configured to open and close the cabinet;

a hinge configured to connect the door to the cabinet to rotatably support the door; and a damper configured to provide a damping force to the door while the door rotates from an open position to a closed position, the damper configured to vary the damping force while the door rotates from the open position to the closed position, wherein the damper includes:

a housing having a space;

a cylinder configured to move in the space of the housing while in contact with the door or the cabinet, the cylinder having a space to accommodate oil therein;

a piston configured to move within the space of cylinder as the cylinder moves, the piston having an orifice through which the oil passes; and an elastic member configured to provide elastic force to the piston, wherein the cylinder includes a first portion having an inner diameter, a second portion having an inner diameter greater than the inner diameter of the first portion, and at least one rib protruding from an inner circumferential surface of the second portion, wherein, when the piston is within the second portion, the piston contacts the at least one rib, wherein a first damping force is generated when the piston is positioned within the first portion, and wherein a second damping force is generated when the piston is positioned within the second portion.

2. The refrigerator of claim 1, wherein the second portion includes:

a first section in which the inner diameter increases from a first position adjacent the first portion to a second position spaced from the first portion; and a second section extending from the first section, the inner diameter of the second section being constant.

3. The refrigerator of claim 1, wherein the at least one rib includes a plurality of ribs spaced apart from one another in a circumferential direction of the second portion.

4. A refrigerator comprising:

a cabinet having a storage space;

a door configured to open and close the cabinet;

a hinge configured to connect the door to the cabinet to rotatably support the door; and a damper configured to provide a damping force to the door while the door rotates from an open position to a closed position, the damper configured to vary the damping force while the door rotates from the open position to the closed position, wherein the damper includes:

a housing having a space;

a cylinder configured to move in the space of the housing while in contact with the door or the cabinet, the cylinder having a space to accommodate oil therein; and a piston configured to move within the space of cylinder as the cylinder moves, the piston having an orifice through which the oil passes, wherein the cylinder includes a first portion having an inner diameter, a second portion having an inner diameter greater than the inner diameter of the first portion, and at least one rib protruding from an inner circumferential surface of the second portion, wherein the second portion includes:

a first section in which the inner diameter increases from a first position adjacent the first portion to a second position spaced from the first portion; and a second section extending from the first section, the inner diameter of the second section being constant, wherein, when the piston is within the second portion, the piston contacts the at least one rib, wherein a first damping force is generated when the piston is positioned within the first portion, and wherein a second damping force is generated when the piston is positioned within the second portion.

5. The refrigerator of claim 4, wherein the at least one rib includes a plurality of ribs spaced apart from one another in a circumferential direction of the second portion.

6. A refrigerator comprising:

a cabinet having a storage space;

a door configured to open and close the cabinet;

a hinge configured to connect the door to the cabinet to rotatably support the door; and a damper configured to provide a damping force to the door while the door rotates from an open position to a closed position, the damper configured to vary the damping force while the door rotates from the open position to the closed position, wherein the damper includes:

a housing having a space;

a cylinder configured to move in the space of the housing while in contact with the door or the cabinet, the cylinder having a space to accommodate oil therein; and a piston configured to move within the space of cylinder as the cylinder moves, the piston having an orifice through which the oil passes; and at least one rib protruding from an inner circumferential surface of the cylinder, wherein the piston is configured to come into contact with the at least one rib over at least portion of a movement path of the cylinder, wherein the cylinder includes a first portion having an inner diameter, and a second portion having an inner diameter greater than the inner diameter of the first portion, wherein a first damping force is generated when the piston is positioned within the first portion, and wherein a second damping force is generated when the piston is positioned within the second portion.

7. The refrigerator of claim 6, wherein the damper further includes an elastic member configured to provide elastic force to the piston.

8. The refrigerator of claim 7, wherein the second portion includes:

a first section in which the inner diameter increases from a first position adjacent the first portion to a second position spaced from the first portion; and a second section extending from the first section, the inner diameter of the second section being constant.

9. The refrigerator of claim 7, wherein the at least one rib is located in the second portion.

10. The refrigerator of claim 6, wherein the at least one rib includes a plurality of ribs spaced apart from one another in a circumferential direction of the cylinder.

* * * * *